(12) United States Patent
Nishiwaki

(10) Patent No.: US 12,187,280 B2
(45) Date of Patent: Jan. 7, 2025

(54) VEHICLE TRAVELING ASSIST DEVICE

(71) Applicant: Mitsubishi Electric Corporation, Tokyo (JP)

(72) Inventor: Kazuhiro Nishiwaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 225 days.

(21) Appl. No.: 17/993,458

(22) Filed: Nov. 23, 2022

(65) Prior Publication Data
US 2023/0174063 A1  Jun. 8, 2023

(30) Foreign Application Priority Data
Dec. 7, 2021  (JP) ................................ 2021-198205

(51) Int. Cl.
| | |
|---|---|
| *B60W 10/00* | (2006.01) |
| *B60W 10/04* | (2006.01) |
| *B60W 10/18* | (2012.01) |
| *B60W 30/16* | (2020.01) |

(52) U.S. Cl.
CPC ............ *B60W 30/16* (2013.01); *B60W 10/04* (2013.01); *B60W 10/18* (2013.01); *B60W 2552/05* (2020.02); *B60W 2552/10* (2020.02); *B60W 2554/4041* (2020.02); *B60W 2554/4042* (2020.02); *B60W 2554/802* (2020.02); *B60W 2720/10* (2013.01); *B60W 2720/106* (2013.01); *B60W 2754/30* (2020.02)

(58) Field of Classification Search
None
See application file for complete search history.

(56) References Cited

U.S. PATENT DOCUMENTS

| | | | | |
|---|---|---|---|---|
| 10,042,815 | B2 * | 8/2018 | Yu ............................. | B60T 8/24 |
| 11,327,496 | B2 * | 5/2022 | Jankovic .............. | G05D 1/0223 |
| 2023/0124314 | A1 * | 4/2023 | Foster ............... | B60W 60/0027 |
| | | | | 701/26 |

FOREIGN PATENT DOCUMENTS

JP  2017-165197 A  9/2017

* cited by examiner

*Primary Examiner* — James M McPherson
(74) *Attorney, Agent, or Firm* — Sughrue Mion, PLLC; Richard C. Turner

(57) ABSTRACT

Provided is a vehicle traveling assist device capable of suppressing deterioration of ride comfort of an own vehicle due to vehicle traveling assist. A target determination unit calculates a target speed and a target distance based on target vehicle speed information. A plan generation unit generates a distance plan and a speed plan based on the target speed and the target distance through use of a three-stage moving average filter. The three-stage moving average filter is a filter including a first moving average filter, a second moving average filter, and a third moving average filter which are sequentially and serially connected to each other. A vehicle control unit generates an acceleration command for an own vehicle based on the distance plan and the speed plan.

16 Claims, 19 Drawing Sheets

VEHICLE TRAVELING ASSIST DEVICE

BACKGROUND OF THE INVENTION

1. Field of the Invention

This disclosure relates to a vehicle traveling assist device.

2. Description of the Related Art

In a related-art vehicle control system, a target speed of an own vehicle is calculated based on an inter-vehicle distance between the own vehicle on a merging lane and another vehicle on a main road lane and a speed of the another vehicle. Further, a driving device and a braking device of the own vehicle are controlled based on the calculated target speed (see, for example, Japanese Patent Application Laid-open No. 2017-165197).

In the above-mentioned related-art vehicle control system, a temporal change in the target speed until the inter-vehicle distance reaches a target distance is calculated as a combination of an acceleration, a constant speed, and a deceleration, but a jerk being a derivative of the acceleration is not considered. Thus, when an actual speed of the own vehicle strictly follows the target speed, there is a fear in that an excessive jerk occurs in the own vehicle, and ride comfort of the own vehicle may consequently deteriorate.

SUMMARY OF THE INVENTION

This disclosure has been made in view of the above-mentioned problem, and has an object to provide a vehicle traveling assist device capable of suppressing deterioration of ride comfort of an own vehicle due to vehicle traveling assist.

According to at least one embodiment of this disclosure, there is provided a vehicle traveling assist device including: a target determination unit configured to calculate a target speed of an own vehicle and a target distance being a target value of an inter-vehicle distance between the own vehicle and a target vehicle based on target vehicle speed information on a speed of the target vehicle; a plan generation unit configured to generate a distance plan being a temporal change in the inter-vehicle distance until the inter-vehicle distance reaches the target distance based on the target distance, and to generate a speed plan being a temporal change in a speed of the own vehicle until the inter-vehicle distance reaches the target distance based on the target speed and the target distance; and a vehicle control unit configured to generate an acceleration command for the own vehicle based on the distance plan and the speed plan, and to supply the generated acceleration command to a driving/braking control device of the own vehicle, wherein the plan generation unit is configured to generate the distance plan and the speed plan through use of a three-stage moving average filter being a filter including a first moving average filter, a second moving average filter, and a third moving average filter which are connected sequentially and in series to each other.

According to the vehicle traveling assist device of the at least one embodiment of this disclosure, it is possible to suppress deterioration of ride comfort of the own vehicle due to the vehicle traveling assist.

DESCRIPTION OF THE EMBODIMENTS

Now, embodiments of this disclosure are described with reference to the drawings.

First Embodiment

Figure 1:
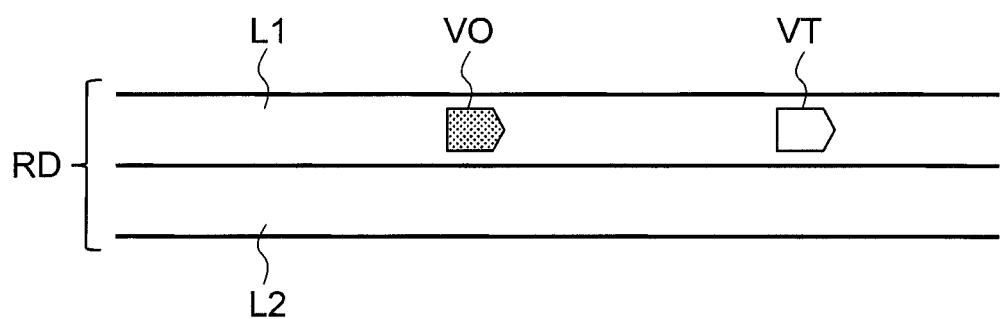
FIG. 1 is a first schematic diagram for illustrating a road, an own vehicle, and a target vehicle to which a vehicle traveling assist device according to a first embodiment of this disclosure is applied.

FIG. 1 is a first schematic diagram for illustrating a road, an own vehicle, and a target vehicle to which a vehicle traveling assist device according to a first embodiment of this disclosure is applied. FIG. 1 is a diagram for illustrating a road RD as viewed from above. The road RD is a road having two lanes on each side, and includes a first lane L1 and a second lane L2. The first lane L1 and the second lane L2 are adjacent to each other.

An own vehicle VO is traveling on the first lane L1. A target vehicle VT is traveling on the first lane L1 in front of the own vehicle VO. That is, the target vehicle VT is a vehicle preceding the own vehicle VO. Although not shown, when a plurality of vehicles are traveling in front of the own vehicle VO, a vehicle having the shortest distance to the own vehicle VO out of the plurality of vehicles is selected as the target vehicle VT.

Figure 2:
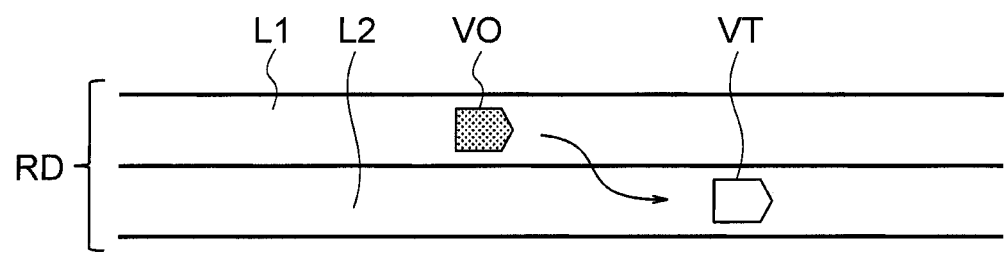
FIG. 2 is a second schematic diagram for illustrating the road, the own vehicle, and the target vehicle to which the vehicle traveling assist device according to the first embodiment is applied.

FIG. 2 is a second schematic diagram for illustrating the road RD, the own vehicle VO, and the target vehicle VT to which the vehicle traveling assist device according to the first embodiment is applied. In FIG. 2, a state in which the own vehicle VO traveling on the first lane L1 is moving to the second lane L2 is illustrated. The target vehicle VT is traveling on the second lane L2 in front or rear of the own vehicle VO. That is, the target vehicle VT is a vehicle preceding the own vehicle VO on the adjacent lane of the lane on which the own vehicle VO is traveling. Although not shown, when a plurality of vehicles are traveling on the second lane L2, a vehicle having the shortest distance to the own vehicle VO out of the plurality of vehicles is selected as the target vehicle VT.

Figure 3:
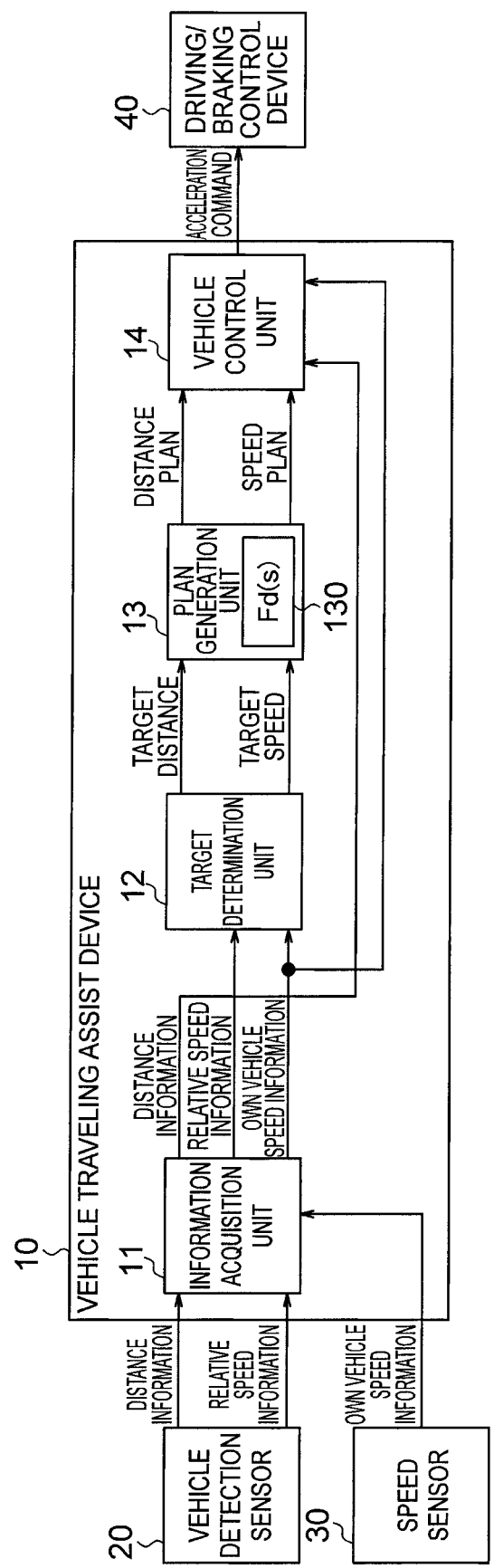
FIG. 3 is a block diagram for illustrating a configuration of a vehicle control device in the first embodiment.

FIG. 3 is a block diagram for illustrating a configuration of a vehicle control device in the first embodiment. The vehicle control device of FIG. 3 includes a vehicle traveling assist device 10, a vehicle detection sensor 20, a speed sensor 30, and a driving/braking control device 40.

The vehicle traveling assist device 10 includes, as functional blocks thereof, an information acquisition unit 11, a target determination unit 12, a plan generation unit 13, and a vehicle control unit 14.

The information acquisition unit 11 acquires distance information and relative speed information from the vehicle detection sensor 20 and acquires own vehicle speed information from the speed sensor 30. The distance information is information on an inter-vehicle distance "d." The inter-vehicle distance "d" is a distance between the own vehicle VO and the target vehicle VT. The relative speed information is information on a relative speed $v_{rel}$. The relative speed $v_{rel}$ is a speed of the target vehicle VT relative to the own vehicle VO. The own vehicle speed information is information on a speed "v" of the own vehicle VO.

The information acquisition unit 11 outputs the distance information to the vehicle control unit 14, and outputs the relative speed information to the target determination unit 12. Moreover, the information acquisition unit 11 outputs the own vehicle speed information to each of the target determination unit 12 and the vehicle control unit 14.

The vehicle detection sensor 20 detects the target vehicle VT. The vehicle detection sensor 20 calculates the inter-vehicle distance "d" and the relative speed $v_{rel}$. The vehicle detection sensor 20 outputs the distance information and the relative speed information to the vehicle traveling assist device 10.

More specifically, for example, the vehicle detection sensor 20 emits radar light in front of the own vehicle VO, and receives the radar light reflected by the target vehicle VT as reflected light. The vehicle detection sensor 20 measures a time difference ΔT between a time at which the radar light is emitted and a time at which the reflected light is received. The vehicle detection sensor 20 multiplies the measured time difference ΔT by a speed "c" of the radar light, to thereby calculate the inter-vehicle distance "d" between the own vehicle VO and the target vehicle VT. Moreover, the vehicle detection sensor 20 calculates a doppler frequency $f_{dop}$ contained in the reflected light, and calculates the relative speed $v_{rel}$ based on the calculated doppler frequency $f_{dop}$.

The speed sensor 30 detects the speed "v" of the own vehicle VO. The speed sensor 30 outputs the own vehicle speed information on the detected speed "v" of the own vehicle VO to the vehicle traveling assist device 10.

The vehicle traveling assist device 10 generates an acceleration command $a_{ref}$ so that the inter-vehicle distance "d" reaches a target distance d*. The target distance d* is a target value of the inter-vehicle distance "d." The acceleration command $a_{ref}$ is supplied to the driving/braking control device 40. The driving/braking control device 40 controls a driving device and a braking device of the own vehicle VO based on the acceleration command $a_{ref}$ output from the vehicle traveling assist device 10.

The target determination unit 12 acquires the own vehicle speed information and the relative speed information from the information acquisition unit 11. The target determination unit 12 calculates the target vehicle speed information based on the own vehicle speed information and the relative speed information. The target vehicle speed information is information on a speed of the target vehicle VT. The speed of the target vehicle VT is a sum of the speed "v" of the own vehicle VO and the relative speed $v_{rel}$. The target determination unit 12 calculates a target speed $v_{tgt}$ based on the target vehicle speed information. In other words, the target determination unit 12 sets the speed of the target vehicle VT to the target speed $v_{tgt}$ of the own vehicle VO. The target speed $v_{tgt}$ is given by Expression (1).

$$v_{tgt}=v_{rel}+v \quad (1)$$

Moreover, the target determination unit 12 calculates the target distance d* based on the target vehicle speed information. In other words, the target determination unit 12 calculates the target distance d* based on the target speed $v_{tgt}$. The target distance d* is given by Expression (2) or Expression (3).

$$d^*=T_{hw}v_{tgt}+D_{stop} \quad (2)$$

$$d^*=-(T_{hw}v_{tgt}+D_{stop}) \quad (3)$$

In Expression (2) and Expression (3), $T_{hw}$ is a time headway and $D_{stop}$ is a stop distance. As the time headway $T_{hw}$, a value in a range of from one second to two seconds is used. For example, the time headway $T_{hw}$ is set by a driver of the own vehicle VO operating a switch mounted to the own vehicle VO. The stop distance $D_{stop}$ is the target distance d* at the time when the target vehicle VT stops. The stop distance $D_{stop}$ may be stored in an internal memory of the target determination unit 12, or may be supplied from the outside of the vehicle control device. Moreover, the stop distance $D_{stop}$ may be set by the driver of the own vehicle VO.

As illustrated in FIG. 1, when the target vehicle VT is a vehicle preceding the own vehicle VO, the target distance d* is set as a positive value as given by Expression (2). As illustrated in FIG. 2, in a case in which the own vehicle VO moves to the adjacent lane, when the own vehicle VO is controlled so that the position of the target vehicle VT is in front of the position of the own vehicle VO, the target distance d* is set as a positive value as given by Expression (2).

In the case in which the own vehicle VO moves to the adjacent lane, when the own vehicle VO is controlled so that the position of the target vehicle VT is in rear of the position of the own vehicle VO, the target distance d* is set as a negative value as given by Expression (3).

The target determination unit 12 outputs the target speed $v_{tgt}$ and the target distance d* to the plan generation unit 13.

The plan generation unit 13 generates a distance plan $d_{plan}$ based on the target distance d*, and generates a speed plan $v_{plan}$ based on the target speed $v_{tgt}$ and the target distance d*. The distance plan $d_{plan}$ is a temporal change in the inter-vehicle distance "d" until the inter-vehicle distance "d" reaches the target distance d*. The speed plan $v_{plan}$ is a temporal change in the speed "v" of the own vehicle until the inter-vehicle distance "d" reaches the target distance d*. The plan generation unit 13 outputs the distance plan $d_{plan}$ and the speed plan $v_{plan}$ to the vehicle control unit 14.

A more specific description is now given of processing for generating the distance plan $d_{plan}$ by the plan generation unit 13. As given by Expression (4), an input distance $d_{in}$ is defined as a step input from a deviation $d_0-d^*_0$ between an inter-vehicle distance initial value $d_0$ and a target distance initial value $d^*_0$ to 0. In this expression, "t" is time, and t=0 is a time at which the step input is started.

$$d_{in} = \begin{cases} d_0 - d_0^* & (t=0) \\ 0 & (t>0) \end{cases} \quad (4)$$

The plan generation unit 13 includes a three-stage moving average filter 130. The three-stage moving average filter 130 is a digital filter. A transmission function of the three-stage moving average filter 130 is represented by $F_d(s)$. The plan generation unit 13 inputs the input distance $d_{in}$ into the three-stage moving average filter 130, and acquires $F_d(s)d_{in}$ as an output thereof.

Figure 4:
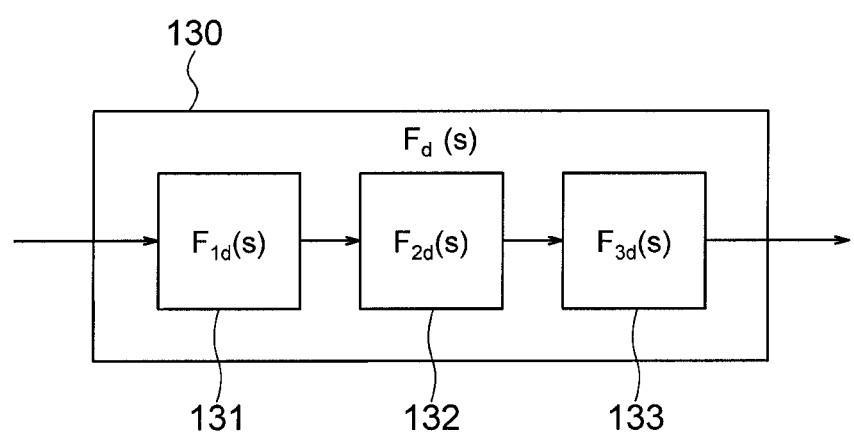
FIG. 4 is a block diagram for illustrating a three-stage moving average filter.

FIG. 4 is a block diagram for illustrating the three-stage moving average filter 130. The three-stage moving average filter 130 is a filter including a first moving average filter 131, a second moving average filter 132, and a third moving average filter 133 which are connected sequentially and in series to each other. The transmission function $F_d(s)$ of the three-stage moving average filter 130 is given by Expression (5). Here, "s" is the Laplace operator.

$$F_d(s) = \\ F_{1d}(s)F_{2d}(s)F_{3d}(s) = \left[\frac{1}{\tau_{1d}} \frac{1-e^{-\tau_{1d}s}}{s}\right]\left[\frac{1}{\tau_{2d}} \frac{1-e^{-\tau_{2d}s}}{s}\right]\left[\frac{1}{\tau_{3d}} \frac{1-e^{-\tau_{3d}s}}{s}\right] \quad (5)$$

In Expression (5), $F_{1d}(s)$ is a transmission function of the first moving average filter 131, $F_{2d}(s)$ is a transmission function of the second moving average filter 132, and $F_{3d}(s)$ is a transmission function of the third moving average filter 133.

The plan generation unit 13 calculates the distance plan $d_{plan}$ from $F_d(s)d_{in}$ and the target distance d* as given by Expression (6).

$$d_{plan} = F_d(s)d_{in} + d^* \quad (6)$$

A time constant of the first moving average filter 131 is a first time constant $\tau_{1d}$. A time constant of the second moving average filter 132 is a second time constant $\tau_{2d}$. A time constant of the third moving average filter 133 is a third time constant $\tau_{3d}$.

The inter-vehicle distance "d" reaches the target distance d* at a time "$(T_{1d}+T_{2d}+T_{3d})$" after the time of the step input.

The plan generation unit 13 subtracts a derivative of $F_d(s)d_{in}$ from the target speed $v_{tgt}$, to thereby calculate the speed plan $v_{plan}$ as given by Expression (7).

$$v_{plan} = -\frac{d}{dt}\{F_d(s)d_{in}\} + v_{tgt} \quad (7)$$

The vehicle control unit 14 acquires the distance information and the own vehicle speed information from the information acquisition unit 11. The vehicle control unit 14 acquires the distance plan $d_{plan}$ and the speed plan $v_{plan}$ from the plan generation unit 13. The vehicle control unit 14 generates the acceleration command $a_{ref}$ for the own vehicle VO based on the distance plan $d_{plan}$ and the speed plan $v_{plan}$.

More specifically, the vehicle control unit 14 generates the acceleration command $a_{ref}$ from a deviation $d-d_{plan}$ between the inter-vehicle distance "d" and the distance plan $d_{plan}$ and a deviation $v_{plan}-v$ between the speed plan $v_{plan}$ and the speed "v" of the own vehicle VO as given by Expression (8).

$$a_{ref} = K_{dp}(d-d_{plan}) + K_{dd}(v_{plan}-V) \quad (8)$$

In Expression (8), $K_{dp}$ is a proportional gain, and $K_{dd}$ is a differential gain. The proportional gain $K_{dp}$ and the differential gain $K_{dd}$ are gains for controlling the inter-vehicle distance "d."

The vehicle control unit 14 may calculate the acceleration command $a_{ref}$ based on Expression (9).

$$a_{ref} = \left(K_{sp} + \frac{K_{si}}{s}\right)(v_{plan} - v) \quad (9)$$

In Expression (9), $K_{sp}$ is a proportional gain, and $K_{si}$ is an integral gain. The proportional gain $K_{sp}$ and the integral gain $K_{si}$ are gains for controlling the speed "v" of the own vehicle VO.

The vehicle control unit 14 supplies the generated acceleration command $a_{ref}$ to the driving/braking control device 40 of the own vehicle VO.

Figure 5:
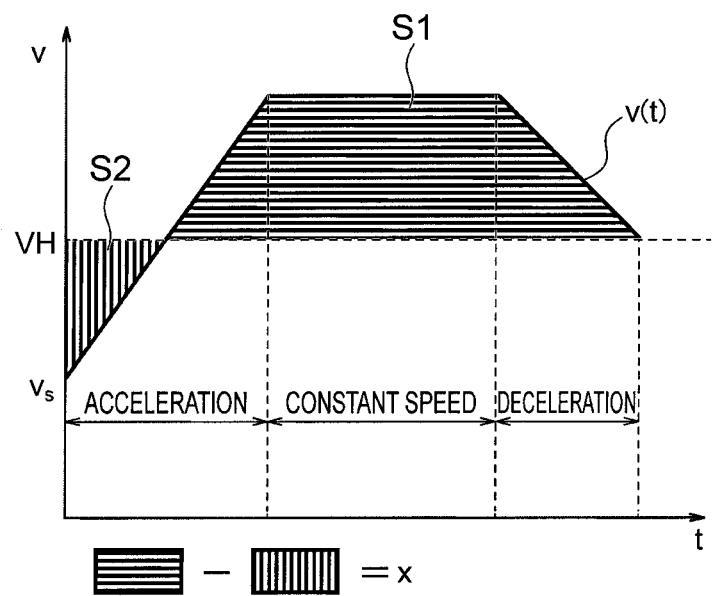
FIG. 5 is a graph for showing an operation of a vehicle control device as a comparative example.

FIG. 5 is a graph for showing an operation of a vehicle control device as a comparative example. In FIG. 5, there is shown a temporal change in the target speed $v_{tgt}$ until the inter-vehicle distance "d" reaches the target distance to the target vehicle traveling at a speed VH higher than a speed $v_s$ of the own vehicle VO. A difference S1-S2 between a first area S1 and a second area S2 is a change amount of the inter-vehicle distance required to reach the target distance. As shown in FIG. 5, the control device in the comparative example causes the inter-vehicle distance "d" to reach the target distance through a combination of an acceleration, a constant speed, and a deceleration.

However, in this comparative example, a jerk being a derivative of the acceleration is not considered. Thus, when a travel control unit strictly follows the target speed $v_{tgt}$, an excessive jerk occurs, and ride comfort of the own vehicle VO consequently deteriorates.

Meanwhile, when the travel control unit slowly follows the target speed $v_{tgt}$, the occurrence of the excessive jerk is suppressed, but the travel distance until the inter-vehicle distance "d" reaches the target distance is increased. For example, on an expressway, a length of a merging section is fixed, and hence, when the travel distance to the merging increases, the merging may become difficult.

Figure 6:
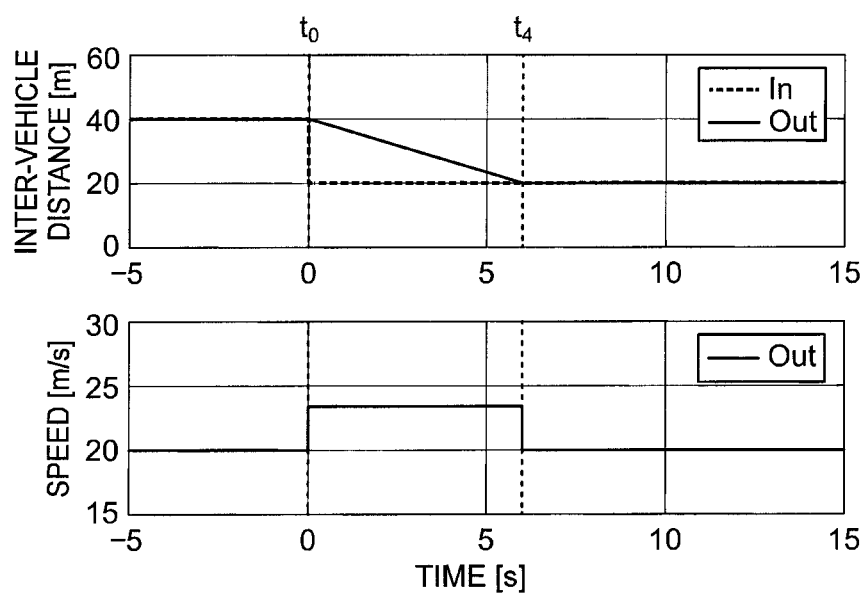
FIG. 6 is a first graph for showing an operation of the three-stage moving average filter of FIG. 4.

FIG. 6 is a first graph for showing an operation of the three-stage moving average filter 130 of FIG. 4.

In the upper row of FIG. 6, an output $F_{1d}(s)d_{in}$ of the first moving average filter 131 at the time when the input distance $d_{in}$ is input to the three-stage moving average filter 130 is shown. The output Fid(s)$d_{in}$ corresponds to the inter-vehicle distance "d." The input distance $d_{in}$ is the step input at the time when the inter-vehicle distance "d" is changed from 40 m to 20 m. In the lower row of FIG. 6, the speed "v" of the own vehicle VO corresponding to the output Fid(s)$d_{in}$ is shown. In this case, the first time constant $\tau_{1d}$ is set to six seconds, the second time constant $\tau_{2d}$ is set to four seconds, and the third time constant $\tau_{3d}$ is set to one second.

The inter-vehicle distance "d" decreases at a constant rate from a time $t_0$, and reaches 20 m being the target distance d' at a time $t_4$ being a time six seconds after the time $t_0$, that is, $\tau_{1d}$ seconds after the time $t_0$. Moreover, the speed "v" of the own vehicle VO changes from 20 m/s to 24 m/s at the time $t_0$, and changes from 24 m/s to 20 m/s at the time $t_4$ being a time six seconds after the time $t_0$. As described above, the speed "v" of the own vehicle VO at the output of the first moving average filter 131 is in a pulse waveform.

Figure 7:
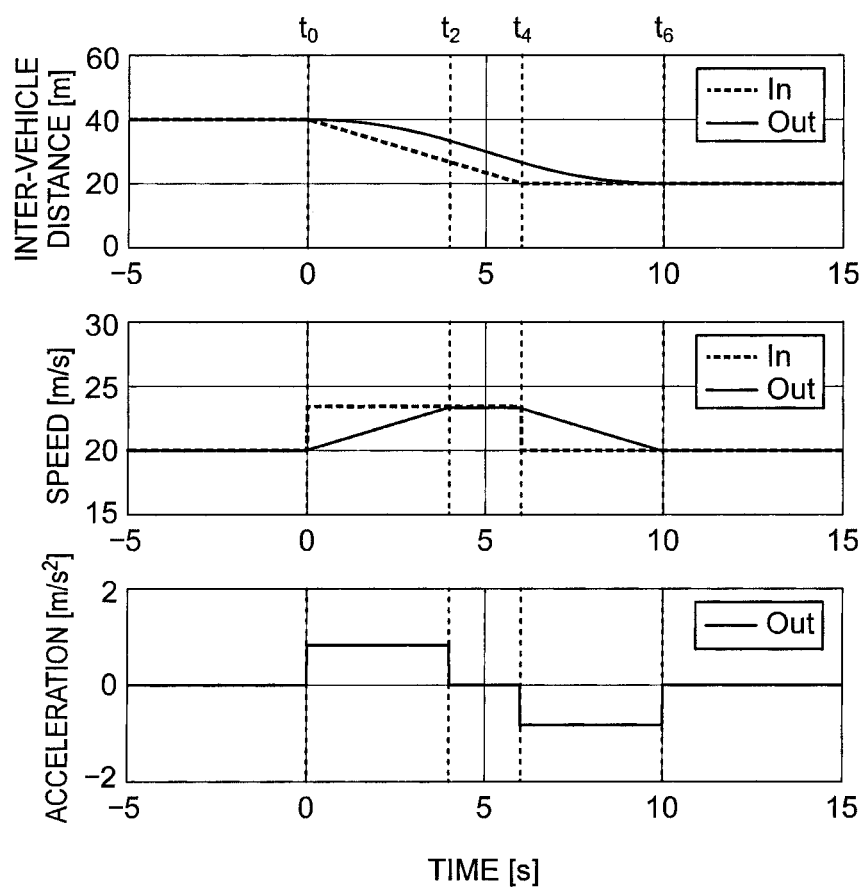
FIG. 7 is a second graph for showing the operation of the three-stage moving average filter of FIG. 4.

FIG. 7 is a second graph for showing the operation of the three-stage moving average filter 130 of FIG. 4.

In the upper row of FIG. 7, an output $F_{1d}(s)F_{2d}(s)d_{in}$ of the second moving average filter 132 at the time when the input distance $d_{in}$ is input to the three-stage moving average filter 130 is shown. In the middle row of FIG. 7, the speed "v" of the own vehicle VO corresponding to the output $F_{1d}(s)F_{2d}(s)d_{in}$ is shown. In the lower row of FIG. 7, an acceleration "a" of the own vehicle VO corresponding to the output $F_{1d}(s)F_{2d}(s)d_{in}$ is shown.

The speed "v" of the own vehicle VO at the output of the second moving average filter 132 increases from the time $t_0$ to a time $t_2$ being a time four seconds after the time $t_0$, that is, $\tau_{2d}$ seconds after the time $t_0$, is constant from the time $t_2$ to the time $t_4$, and decreases from the time $t_4$ to a time $t_6$. Moreover, the inter-vehicle distance "d" reaches 20 m being the target distance d' at the time $t_6$ being a time ten seconds after the step input, that is, $(\tau_{1d}+\tau_{2d})$ seconds after the step input. As described above, the speed "v" of the own vehicle VO after the passage of the second moving average filter 132 is divided into three sections being an acceleration section, a constant speed section, and a deceleration section.

Figure 8:
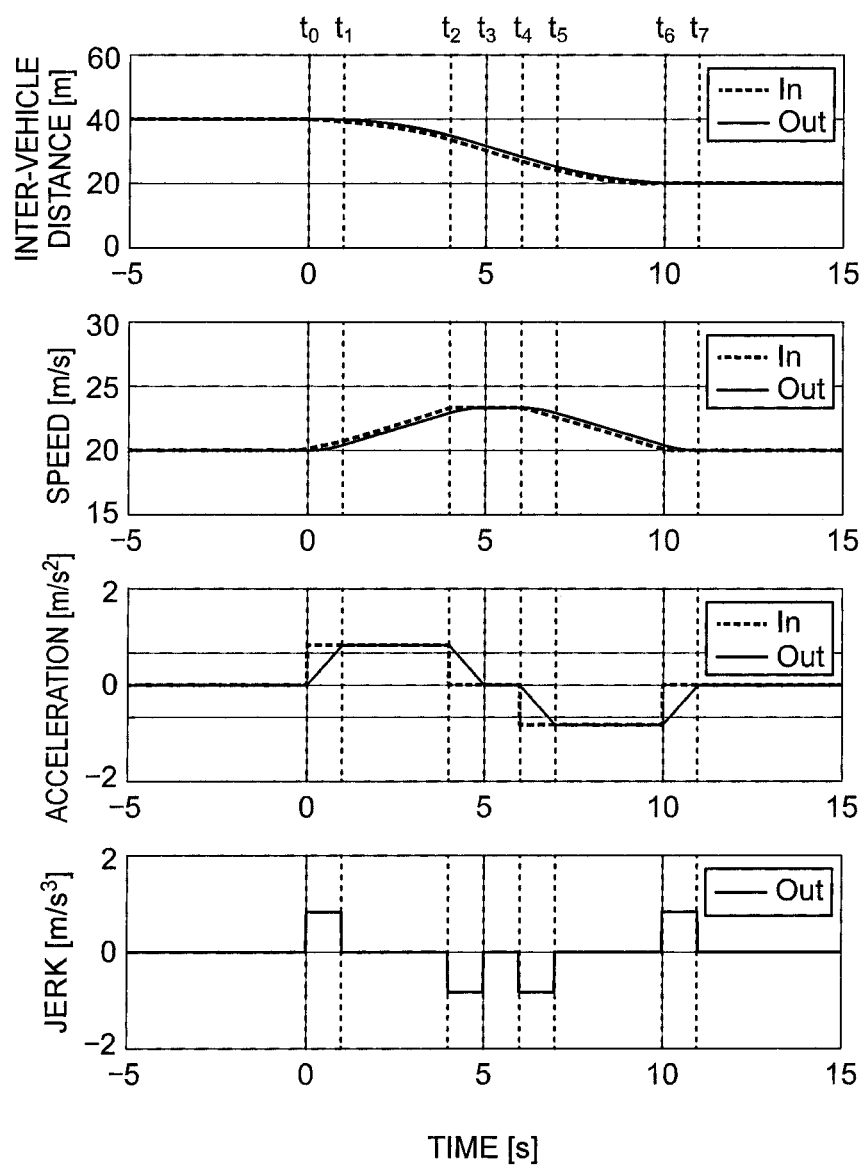
FIG. 8 is a third graph for showing the operation of the three-stage moving average filter of FIG. 4.

FIG. 8 is a third graph for showing the operation of the three-stage moving average filter 130 of FIG. 4.

In the uppermost row of FIG. 8, the output $F_d(s)d_{in}$ obtained by inputting the input distance $d_{in}$ into the three-stage moving average filter 130 is shown. In the second row of FIG. 8, the speed "v" of the own vehicle VO corresponding to the output $F_d(s)d_{in}$ is shown. In the third row of FIG. 8, the acceleration "a" of the own vehicle VO corresponding to the output $F_d(s)d_{in}$ is shown. In the lowermost row of FIG. 8, the jerk of the own vehicle VO corresponding to the output $F_d(s)d_{in}$ is shown.

The acceleration "a" of the own vehicle VO of FIG. 8 can be divided into the following first section to seventh section.

First section: A section from the time $t_0$ to a time $t_1$ is a section in which the acceleration increases.

Second section: A section from the time $t_1$ to a time $t_2$ is a section in which the acceleration is constant.

Third section: A section from the time $t_2$ to a time $t_3$ is a section in which the acceleration decreases.

Fourth section: A section from the time $t_3$ to a time $t_4$ is a section in which the speed is constant.

Fifth section: A section from the time $t_4$ to a time $t_5$ is a section in which the deceleration increases.

Sixth section: A section from the time $t_5$ to a time $t_6$ is a section in which the deceleration is constant.

Seventh section: A section from the time $t_6$ to a time $t_7$ is a section in which the deceleration decreases.

In this case, the time $t_1$ is a time $\tau_{3d}$ seconds after the time $t_0$. The time $t_2$ is a time $\tau_{2d}$ seconds after the time $t_0$. The time $t_3$ is a time $(\tau_{2d}+\tau_{3d})$ seconds after the time $t_0$. The time $t_4$ is a time $\tau_{1d}$ seconds after the time $t_0$. The time $t_5$ is a time $(\tau_{2d}+\tau_{3d})$ seconds after the time $t_0$. The time $t_6$ is a time $(\tau_{2d}+\tau_{2d})$ seconds after the time $t_0$. The time $t_7$ is a time $(\tau_{2d}+\tau_{2d}+\tau_{3d})$ seconds after the time $t_0$.

Moreover, the inter-vehicle distance reaches the target distance d* at the time $t_7$. That is, the inter-vehicle distance "d" reaches the target distance d* eleven seconds after the step input.

As a result, the jerk occurring in the own vehicle VO is 0 in the second section, the fourth section, and the sixth section, and is suppressed to finite values in the first section, the third section, the fifth section, and the seventh section.

As described above, the plan generation unit 13 of FIG. 3 can calculate, through the processing by the three-stage moving average filter 130, the distance plan $d_{plan}$ and the speed plan $v_{plan}$ in which a quick change in the acceleration "a" of the own vehicle VO is suppressed.

The second time constant $\tau_{2d}$ is equal to or smaller than the first time constant $\tau_{1d}$, and is equal to or larger than the third time constant $\tau_{3d}$. That is, a relationship of $\tau_{1d} \geq \tau_{2d} \geq \tau_{3d}$ is satisfied. Moreover, when the first time constant $\tau_{1d}$ and the second time constant $\tau_{2d}$ are set to values equal to each other, the waveform representing the acceleration "a" of FIG. 8 is a waveform without the fourth section. Moreover, when the second time constant $\tau_{2d}$ and the third time constant $\tau_{3d}$ are set to values equal to each other, the waveform representing the acceleration "a" of FIG. 8 is a waveform without the second section and the sixth section.

Figure 9:
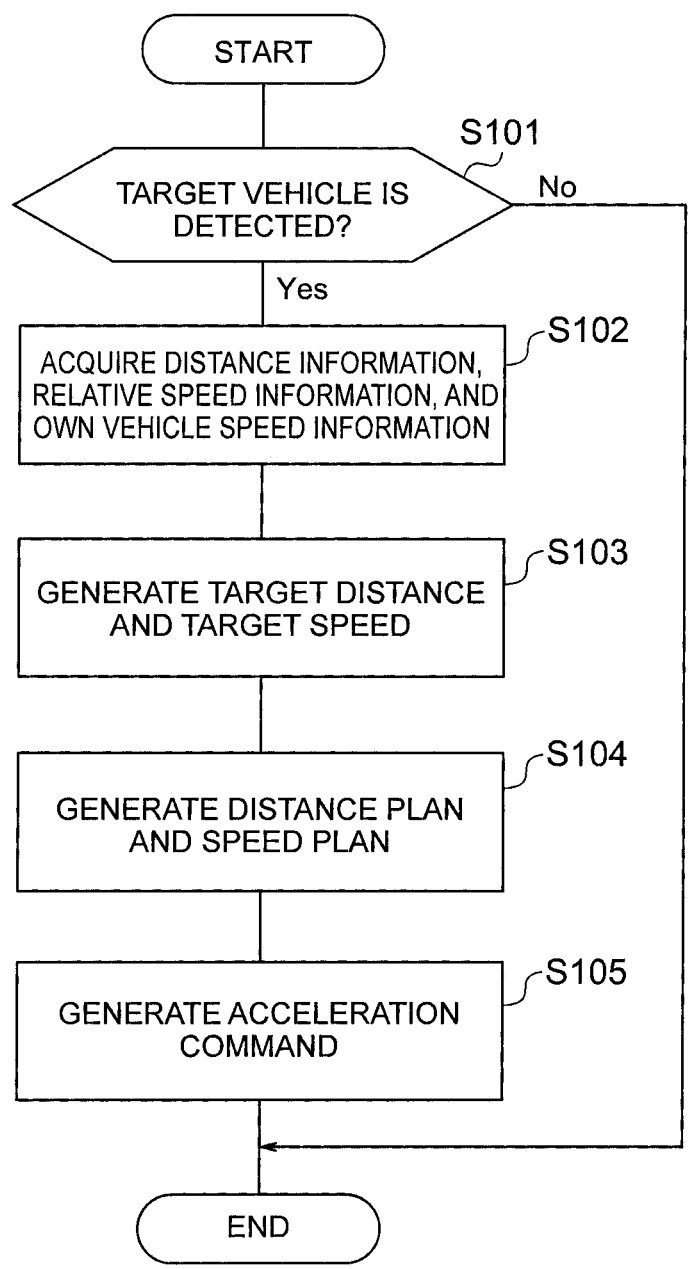
FIG. 9 is a flowchart for illustrating a vehicle traveling assist routine executed by the vehicle traveling assist device of FIG. 3.

FIG. 9 is a flowchart for illustrating a vehicle traveling assist routine executed by the vehicle traveling assist device 10 of FIG. 3. The routine of FIG. 9 is executed, for example, each time a constant period elapses after an ignition key switch of the own vehicle VO is turned on. When the routine of FIG. 9 is started, in Step S101, the information acquisition unit 11 determines whether or not a target vehicle VT is detected.

When a target vehicle VT is not detected, the information acquisition unit 11 temporarily terminates this routine.

When a target vehicle VT is detected, in Step S102, the information acquisition unit 11 acquires the distance information, the relative speed information, and the own vehicle speed information.

After that, in Step S103, the target determination unit 12 generates the target distance d* and the target speed $v_{tgt}$.

After that, in Step S104, the plan generation unit 13 generates the distance plan $d_{plan}$ and the speed plan $v_{plan}$.

After that, the vehicle control unit 14 generates the acceleration command $a_{ref}$ in Step S105, outputs the generated acceleration command $a_{ref}$ to the driving/braking control device 40, and temporarily terminates this routine.

As described above, the vehicle traveling assist device 10 includes the target determination unit 12, the plan generation unit 13, and the vehicle control unit 14. The target determination unit 12 calculates the target speed $v_{tgt}$ of the own vehicle VO and the target distance d* based on the target vehicle speed information. The target vehicle speed information is the information on the speed of the target vehicle VT. The target distance d* is the target value of the inter-vehicle distance between the own vehicle VO and the target vehicle VT.

The plan generation unit 13 generates the distance plan $d_{plan}$ based on the target distance d*, and generates the speed plan $v_{plan}$ based on the target speed $v_{tgt}$ and the target distance d*. The distance plan $d_{plan}$ is a temporal change in the inter-vehicle distance until the inter-vehicle distance reaches the target distance d*. The speed plan $v_{plan}$ is a temporal change in the speed "v" of the own vehicle VO until the inter-vehicle distance "d" reaches the target distance d*. The vehicle control unit 14 generates the acceleration command $a_{ref}$ for the own vehicle VO based on the distance plan $d_{plan}$ and the speed plan $v_{plan}$, and supplies the generated acceleration command $a_{ref}$ to the driving/braking control device 40 of the own vehicle VO.

The plan generation unit 13 generates the distance plan $d_{plan}$ and the speed plan $v_{plan}$ through use of the three-stage moving average filter 130. The three-stage moving average filter 130 is the filter including the first moving average filter 131, the second moving average filter 132, and the third moving average filter 133 which are connected sequentially and in series to each other.

As described above, according to the vehicle traveling assist device 10 of the first embodiment, it is possible to reduce the jerk occurring in the own vehicle VO during the vehicle traveling assist through use of the three-stage moving average filter 130. Thus, it is possible to suppress the deterioration of the ride comfort of the own vehicle VO due to the vehicle traveling assist.

Thus, it is not required to increase the travel distance of the own vehicle VO during the vehicle traveling assist, to thereby reduce the jerk occurring in the own vehicle VO.

Moreover, the target vehicle VT is a vehicle traveling in front on the lane on which the own vehicle VO is traveling.

With this configuration, the jerk occurring in the own vehicle VO due to the acceleration/deceleration for causing the own vehicle VO to follow the preceding vehicle is reduced. The preceding vehicle is a vehicle traveling in front on the lane on which the own vehicle VO is traveling. As a result, it is possible to suppress the deterioration of the ride comfort of the own vehicle VO.

Further, the target vehicle VT is a vehicle which is traveling on a lane to which the own vehicle VO is going to move.

With this configuration, the jerk occurring in the own vehicle VO due to the acceleration/deceleration for securing the inter-vehicle distance between the own vehicle VO and the vehicle traveling on the lane to which the own vehicle VO is going to move is reduced. As a result, it is possible to suppress the deterioration of the ride comfort of the own vehicle VO.

Moreover, the first time constant $\tau_{1d}$ and the second time constant $\tau_{2d}$ may be set to values equal to each other, and the third time constant $\tau_{3d}$ may be set to a value smaller than the first time constant $\tau_{1d}$ and the second time constant $\tau_{2d}$.

With this configuration, it is possible to remove the constant speed section from the output of the three-stage moving average filter 130 for the input distance $d_{in}$, thereby further reducing the jerk occurring in the own vehicle VO due to the acceleration/deceleration during the vehicle traveling assist. As a result, it is possible to further suppress the deterioration of the ride comfort of the own vehicle VO.

Moreover, the first time constant $\tau_{1d}$, the second time constant $\tau_{2d}$, and the third time constant $\tau_{3d}$ may be set to values equal to one another.

With this configuration, it is possible to remove the constant speed section, the section of the constant acceleration, and the section of the constant deceleration from the output of the three-stage moving average filter 130 for the input distance $d_{in}$, thereby further reducing the jerk occurring in the own vehicle VO due to the acceleration/deceleration during the vehicle traveling assist. As a result, it is possible to further suppress the deterioration of the ride comfort of the own vehicle VO.

The plan generation unit 13 generates the distance plan $d_{plan}$ and the speed plan $v_{plan}$ in the first embodiment, but the plan generation unit 13 may further generate an acceleration plan $a_{plan}$ and may output the generated acceleration plan $a_{plan}$ to the vehicle control unit 14.

The acceleration plan $a_{plan}$ is given by Expression (10).

$$a_{plan} = -\frac{d^2}{dt^2}\{F_d(s)d_{in}\} \tag{10}$$

In this case, the vehicle control unit 14 is only required to calculate the acceleration command $a_{ref}$ as given by Expression (11) based on the distance plan $d_{plan}$, the speed plan $v_{plan}$, and the acceleration plan $a_{plan}$.

$$a_{ref} = K_{dp}(d-d_{plan}) \pm K_{dd}(v_{plan}-v)+a_{plan} \tag{11}$$

Moreover, the vehicle control unit 14 may calculate the acceleration command $a_{ref}$ through Expression (12).

$$a_{ref} = \left(K_{sp} + \frac{K_{si}}{s}\right)(v_{plan} - v) + a_{plan} \tag{12}$$

As described above, the plan generation unit 13 generates the acceleration plan $a_{plan}$, and the vehicle control unit 14 adds the acceleration plan $a_{plan}$ to the output of feedback control. As a result, the inter-vehicle distance "d" can be caused to precisely follow the distance plan $d_{plan}$.

Second Embodiment

Figure 10:
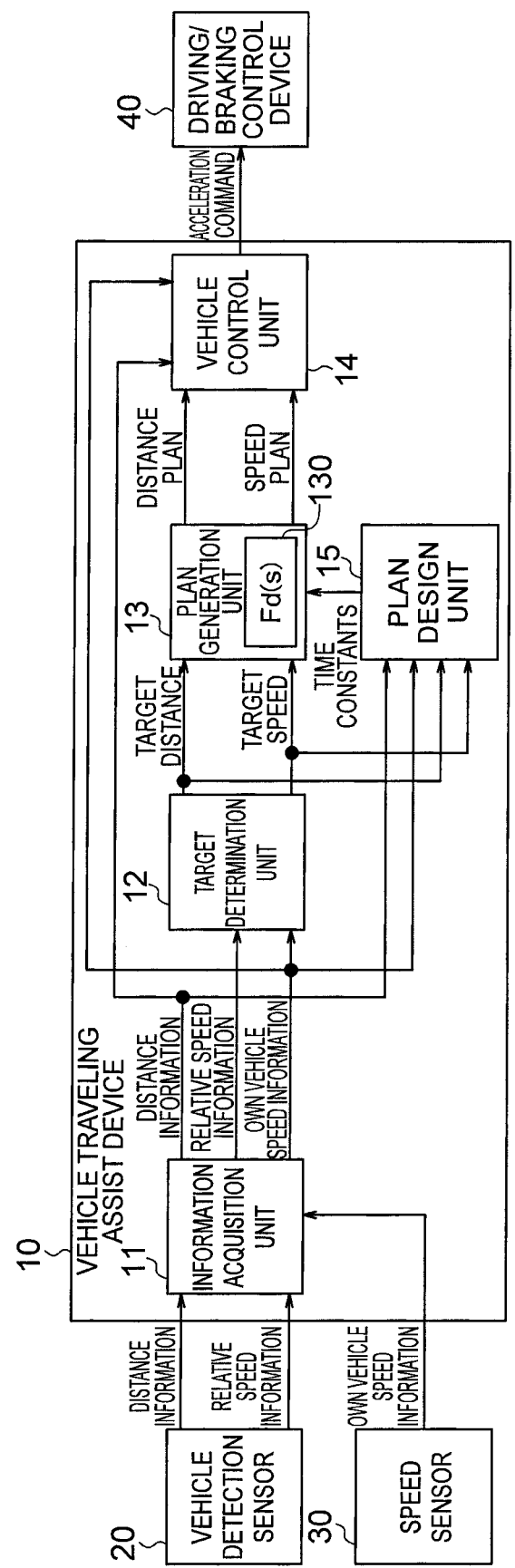
FIG. 10 is a block diagram for illustrating a configuration of a vehicle control device in a second embodiment of this disclosure.

Description is now given of a vehicle traveling assist device according to a second embodiment of this disclosure. FIG. 10 is a block diagram for illustrating a configuration of a vehicle control device in the second embodiment. The vehicle control device of FIG. 10 includes the vehicle traveling assist device 10, the vehicle detection sensor 20, the speed sensor 30, and the driving/braking control device 40.

The vehicle traveling assist device 10 includes, as functional blocks thereof, the information acquisition unit 11, the target determination unit 12, the plan generation unit 13, the vehicle control unit 14, and a plan design unit 15. In FIG. 10, the same elements as those of FIG. 3 are denoted by the same reference symbols.

The vehicle traveling assist device 10 of FIG. 10 is different from the vehicle traveling assist device 10 according to the first embodiment in the following two points.

1. The plan design unit 15 calculates the first time constant $\tau_{1d}$, the second time constant $\tau_{2d}$, and the third time constant $\tau_{3d}$ based on the own vehicle speed information, the distance information, the target speed $v_{tgt}$, and the target distance d*.

2. The plan generation unit 13 uses the calculated first time constant $\tau_{1d}$, second time constant $\tau_{2d}$, and third time constant $\tau_{3d}$ to generate the distance plan $d_{plan}$ and the speed plan $v_{plan}$.

The information acquisition unit 11, the target determination unit 12, and the vehicle control unit 14 of FIG. 10 are the same as the information acquisition unit 11, the target determination unit 12, and the vehicle control unit 14 of FIG. 3, respectively, and hence description thereof is omitted.

The plan design unit 15 calculates the first time constant $\tau_{1d}$, the second time constant $\tau_{2d}$, and the third time constant $\tau_{3d}$ so that a travel distance $x_{trv}$ of the own vehicle VO during a following period matches a target travel distance $X_{trv}$. The following period is a period until the speed "v" of the own vehicle VO matches the target speed $v_{tgt}$, and the inter-vehicle distance "d" matches the target distance d*.

Moreover, when the own vehicle VO is a vehicle traveling on the merging lane, and the target vehicle VT is a vehicle traveling on the main road lane, the target travel distance $X_{trv}$ is equal to or shorter than the length of the merging section.

Figure 11:
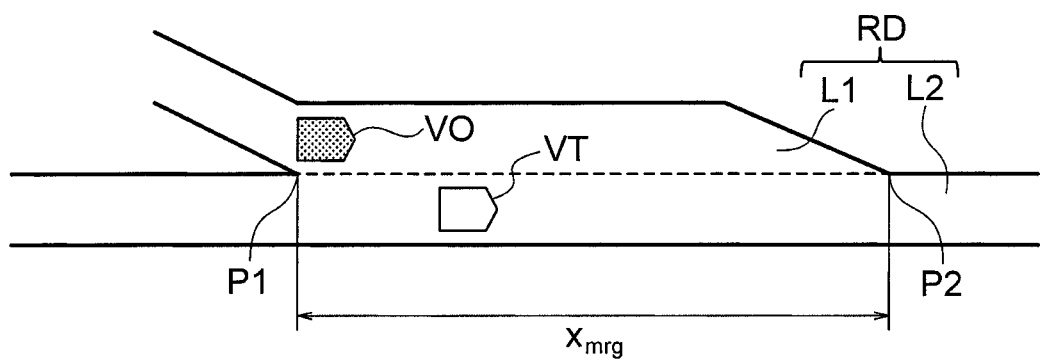
FIG. 11 is a schematic diagram for illustrating a length of a merging section.

FIG. 11 is a schematic diagram for illustrating the length of the merging section. In FIG. 11, the first lane L1 corresponds to the merging lane, and the second lane L2 corresponds to the main road lane. The own vehicle VO is traveling on the first lane L1 as the merging lane. The target vehicle VT is traveling on the second lane L2 as the main road lane.

The first lane L1 and the second lane L2 marge at a point P1. Moreover, the first lane L1 comes to a dead end at a point P2. In the merging section from the point P1 to the point P2, the first lane L1 and the second lane L2 are adjacent to each other. That is, the merging section is a section in which the main road lane and the merging lane are adjacent to each other. In the merging section, a vehicle traveling on the first lane L1 can move to the second lane L2. In this case, the target travel distance $X_{trv}$ is set to a length equal to or shorter than a length $x_{mrg}$ of the merging section.

A more detailed description is now given of the operation of the vehicle control device of FIG. 10. Here, an operation of the plan design unit 15 is mainly described.

The plan design unit 15 acquires the own vehicle speed information and the distance information from the information acquisition unit 11. Moreover, the plan design unit 15 acquires the target speed $v_{tgt}$ and the target distance d' from the target determination unit 12. The plan design unit 15 calculates the first time constant $\tau_{1d}$, the second time constant $\tau_{2d}$, and the third time constant $\tau_{3d}$ based on the acquired own vehicle speed information, distance information, target speed $v_{tgt}$, and target distance d*.

Figure 12:
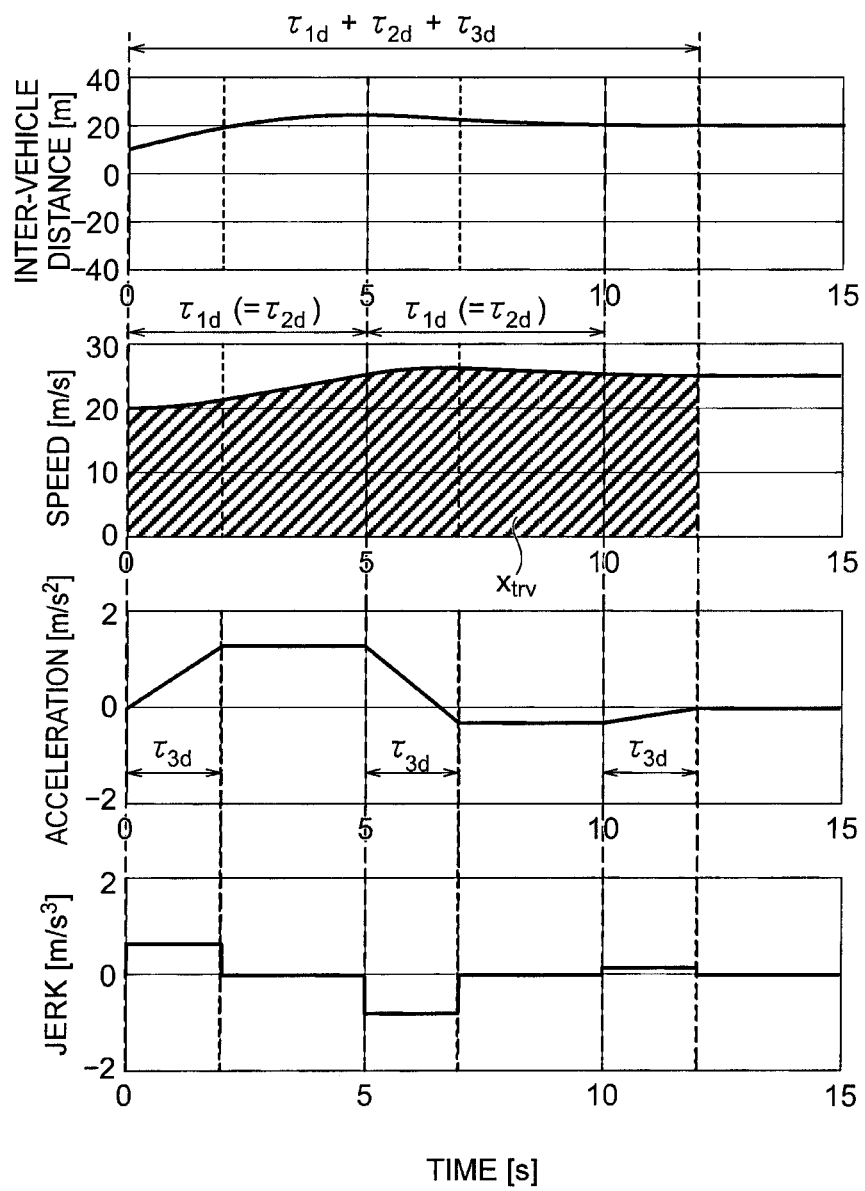
FIG. 12 is a graph for showing a first example of an operation of the vehicle traveling assist device of FIG. 10.
Figure 13:
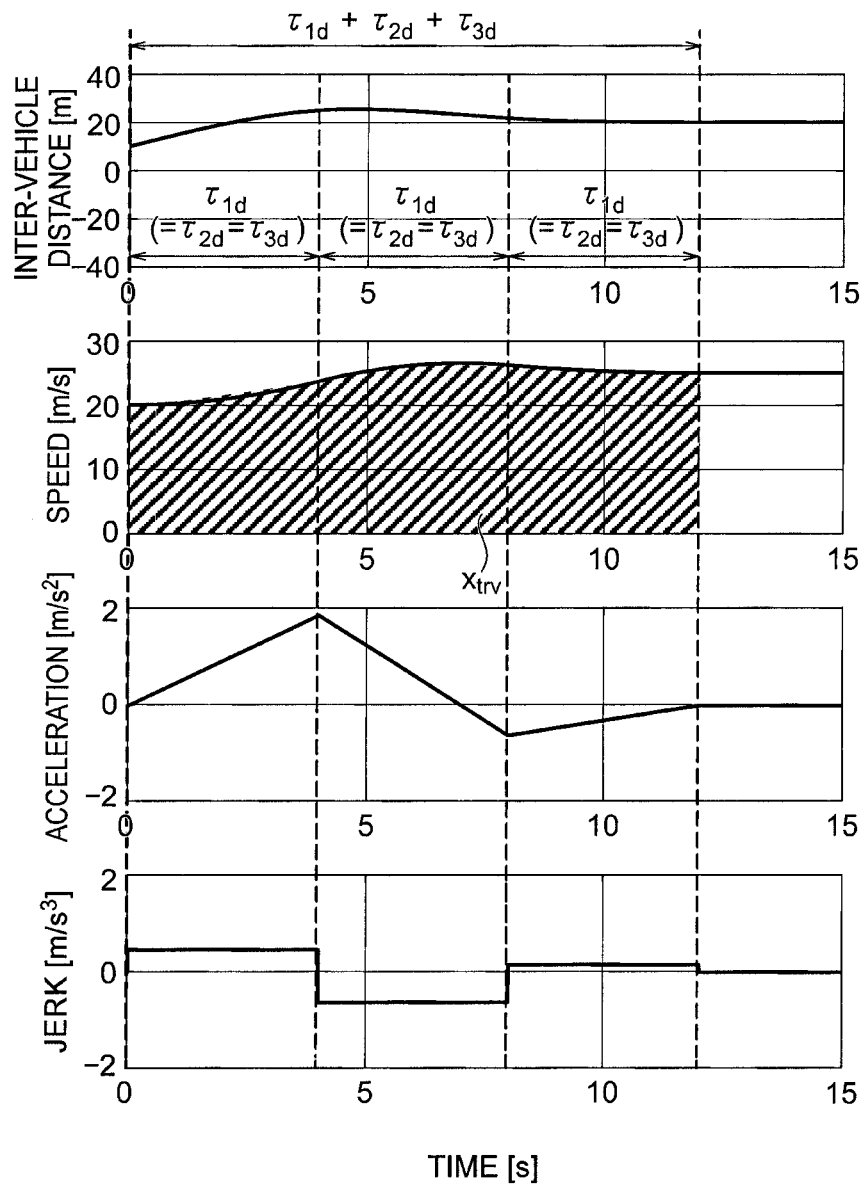
FIG. 13 is a graph for showing a second example of the operation of the vehicle traveling assist device of FIG. 10.

FIG. 12 is a graph for showing a first example of the operation of the vehicle traveling assist device 10 of FIG. 10. FIG. 13 is a graph for showing a second example of the operation of the vehicle traveling assist device 10 of FIG. 10. In FIG. 12, a first example of the output waveform obtained by inputting the input distance $d_{in}$ into the three-stage moving average filter 130 is shown. In FIG. 13, a second example of the output waveform obtained by inputting the input distance $d_{in}$ into the three-stage moving average filter 130 is shown.

In this case, as an initial condition, an inter-vehicle distance initial value $d_0$ is set to 10 m, a target distance initial value $d*_0$ is set to 20 m, the speed "v" of the own vehicle VO is set to 20 m/s, and the target speed $v_{tgt}$ is set to 25 m/s.

The travel distance $x_{trv}$ of the own vehicle VO during the following period is given as Expression (13). Expression (13) corresponds to each of areas of the hatched portions of FIG. 12 and FIG. 13.

$$\int_0^{\tau_{1d}+\tau_{2d}+\tau_{3d}}\{v\}dt=X_{trv} \tag{13}$$

When the target speed $v_{tgt}$ is constant, a change amount of the inter-vehicle distance "d", that is, a deviation $d_0-d*_0$ between the inter-vehicle distance initial value $d_0$ and the target distance initial value $d*_0$, during the following period is expressed as given by Expression (14).

$$\int_0^{\tau_{1d}+\tau_{2d}+\tau_{3d}}\{v_{tgt}-v\}dt=d_0^*-d_0 \tag{14}$$

When the target speed $v_{tgt}$ is constant, the travel distance of the target vehicle VT during the following period is expressed as given by Expression (15).

$$\int_0^{\tau_{1d}+\tau_{2d}+\tau_{3d}}\{v_{tgt}\}dt=v_{tgt}(\tau_{1d}+\tau_{2d}+\tau_{3d}) \tag{15}$$

When Expression (13) to Expression (15) are rearranged, a relationship given by Expression (16) is satisfied among the first time constant $\tau_{1d}$, the second time constant $\tau_{2d}$, the third time constant $\tau_{3d}$, the target travel distance $X_{trv}$, the inter-vehicle distance initial value $d_0$, the target distance initial value $d*_0$, and the target speed $v_{tgt}$.

$$\tau_{1d}+\tau_{2d}+\tau_{3d}=\frac{X_{trv}+d_0^*-d_0}{v_{tgt}} \tag{16}$$

As described above, when the target travel distance $X_{trv}$ is set in advance, a sum of the first time constant $\tau_{1d}$, the second time constant $\tau_{2d}$, and the third time constant $\tau_{3d}$ is determined based on Expression (16) so that the travel distance $x_{trv}$ reaches the target travel distance $X_{trv}$. For example, when the target travel distance $X_{trv}$ is 190 m, the sum of the first time constant $\tau_{1d}$, the second time constant $\tau_{2d}$, and the third time constant $\tau_{3d}$ is 12 seconds.

Moreover, when the own vehicle VO is a merging vehicle, and the target vehicle VT is a main road vehicle, the target travel distance $X_{trv}$ may be set to the length $x_{mrg}$ of the merging section. In this case, the target travel distance $X_{trv}$ is acquired from a map information storage unit (not shown). The map information storage unit may be included in the vehicle traveling assist device, or may be provided outside the own vehicle VO.

Description is now given of a method of determining the first time constant $\tau_{1d}$, the second time constant $\tau_{2d}$, and the third time constant $\tau_{3d}$ from Expression (16). When the first time constant $\tau_{1d}$ is larger than the second time constant $\tau_{2d}$, the own vehicle VO travels at a constant speed in the fourth section as described with reference to FIG. 8. In the fourth section in which the own vehicle VO travels at the constant speed, the jerk does not occur, but the jerk occurs in the third section and the fifth section before and after thereof, and hence the jerk fluctuates from the third section to the fifth section.

In contrast, when the first time constant $\tau_{1d}$ and the second time constant $\tau_{2d}$ are equal to each other, the fourth section does not exist, and hence the fluctuation of the jerk is suppressed from the third section to the fifth section.

Thus, the first time constant $\tau_{1d}$ and the second time constant $\tau_{2d}$ are set to values equal to each other. Moreover, the first time constant $\tau_{1d}$, the second time constant $\tau_{2d}$, and the third time constant $\tau_{3d}$ have the relationship of $\tau_{1d} \geq \tau_{2d} \geq \tau_{3d}$, and hence the first time constant $\tau_{1d}$, the second time constant $\tau_{2d}$, and the third time constant $\tau_{3d}$ are determined as given by Expression (17) and Expression (18) through use of a coefficient $k_r$. In this case, the coefficient $k_r$ is a ratio of the third time constant $\tau_{3d}$ to the sum $\tau_{1d}+\tau_{2d}+\tau_{3d}$ of the first time constant $\tau_{1d}$, the second time constant $\tau_{2d}$, and the third time constant $\tau_{3d}$. A possible range of a value of the coefficient $k_r$ is $0<k_r\leq 1/3$.

$$\tau_{1d} = \tau_{2d} = \frac{1-k_r}{2} \frac{X_{trv} + d_0^* - d_0}{v_{tgt}} \quad (17)$$

$$\tau_{3d} = k_r \frac{X_{trv} + d_0^* - d_0}{v_{tgt}} \quad (18)$$

The first example of FIG. 12 is a case in which $k_r=\frac{1}{6}$, $\tau_{1d}=\tau_{2d}=5$ seconds, and $\tau_{3d}=2$ seconds are set with respect to $\tau_{1d}+\tau_{2d}+\tau_{3d}=12$ seconds. The second example of FIG. 13 is a case in which $k_r=\frac{1}{3}$ and $\tau_{1d}+\tau_{2d}+\tau_{3d}=4$ seconds are set with respect to $\tau_{1d}+\tau_{2d}+\tau_{3d}=12$ seconds.

An acceleration in the first example of FIG. 12 is lower than an acceleration in the second example of FIG. 13. Moreover, a jerk in the second example is smaller than a jerk in the first example. As described above, as the third time constant $\tau_{3d}$ increases, that is, as the coefficient $k_r$ increases, the jerk is suppressed more.

In the manner described above, the first time constant $\tau_{1d}$, the second time constant $\tau_{2d}$, and the third time constant $\tau_{3d}$ for causing the inter-vehicle distance "d" to reach the target distance d* can be determined through Expression (17) and Expression (18) while the jerk occurring in the own vehicle VO is suppressed.

Figure 14:
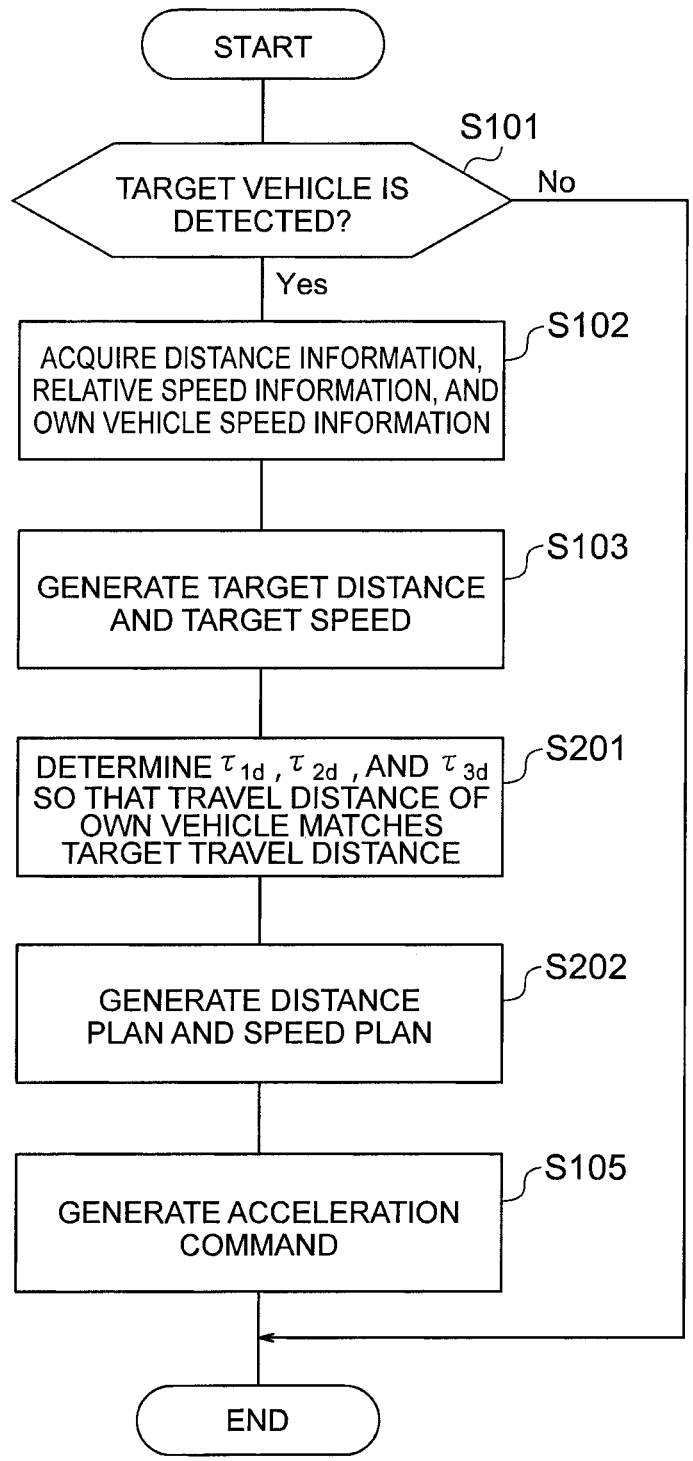
FIG. 14 is a flowchart for illustrating a vehicle traveling assist routine executed by the vehicle traveling assist device of FIG. 10.

FIG. 14 is a flowchart for illustrating a vehicle traveling assist routine executed by the vehicle traveling assist device 10 of FIG. 10. The routine of FIG. 14 is executed, for example, each time a constant period elapses after the ignition key switch of the own vehicle VO is turned on. In the routine of FIG. 14, the same steps as those of the routine of FIG. 9 are denoted by the same step numbers. Moreover, a detailed description of the same steps as those of the routine of FIG. 9 is omitted.

When a target vehicle VT is not detected in Step S101, the information acquisition unit 11 temporarily terminates this routine.

When a target vehicle VT is detected, in Step S102, the information acquisition unit 11 acquires the distance information, the relative speed information, and the own vehicle speed information. After that, in Step S103, the target determination unit 12 generates the target distance d* and the target speed $v_{tgt}$.

After that, in Step S201, the plan design unit 15 uses Expression (17) and Expression (18) to determine the first time constant $\tau_{1d}$, the second time constant $\tau_{2d}$, and the third time constant $\tau_{3d}$ so that the travel distance $x_{trv}$ of the own vehicle VO matches the target travel distance $X_{trv}$.

After that, in Step S202, the plan generation unit 13 generates the distance plan $d_{plan}$ and the speed plan $v_{plan}$ based on the determined first time constant $\tau_{1d}$, second time constant $\tau_{2d}$, and third time constant $\tau_{3d}$.

After that, the vehicle control unit 14 generates the acceleration command $a_{ref}$ in Step S105, outputs the generated acceleration command $a_{ref}$ to the driving/braking control device 40, and temporarily terminates this routine.

As described above, the vehicle traveling assist device 10 according to the second embodiment further includes the plan design unit 15. The plan design unit 15 calculates the first time constant $\tau_{1d}$, the second time constant $\tau_{2d}$, and the third time constant $\tau_{3d}$ based on the own vehicle speed information, the distance information, the target speed $v_{tgt}$, and the target distance d*. The own vehicle speed information is the information on the speed "v" of the own vehicle VO. The distance information is the information on the inter-vehicle distance "d" between the own vehicle VO and the target vehicle VT.

With this configuration, the first time constant $\tau_{1d}$, the second time constant $\tau_{2d}$, and the third time constant $\tau_{3d}$ are changed in response to the state, and hence the own vehicle VO can be caused to more smoothly follow the target vehicle VT.

Moreover, the plan design unit 15 calculates the first time constant $\tau_{1d}$, the second time constant $\tau_{2d}$, and the third time constant $\tau_{3d}$ so that a following travel distance matches the target travel distance $X_{trv}$. The following travel distance is the travel distance $x_{trv}$ of the own vehicle VO during the following period.

With this configuration, in the acceleration and the deceleration of the own vehicle VO until the target distance d* and the target speed $v_{tgt}$ are reached, the deterioration of the ride comfort due to the excessive jerk can be suppressed while the travel distance $x_{trv}$ is limited.

Moreover, the own vehicle VO is a vehicle traveling on the merging lane, the target vehicle VT is a vehicle traveling on the main road lane, and the target travel distance $x_{trv}$ is a length equal to or shorter than the length $x_{mrg}$ of the merging section. The merging section is the section in which the main road lane is adjacent to the merging lane.

With this configuration, when the own vehicle VO moves from the merging lane to the main road lane on the expressway, the jerk occurring in the own vehicle VO due to the acceleration and deceleration for securing the inter-vehicle distance "d" to the main road vehicle is reduced. As a result, the deterioration of the ride comfort of the own vehicle VO can be suppressed. Moreover, the own vehicle VO can be moved to the main road lane before the own vehicle VO reaches a terminal of the merging lane.

In the second embodiment, when the target vehicle VT is traveling in front of the own vehicle VO, and the speed of the target vehicle VT is lower than the speed "v" of the own vehicle VO, the first time constant $\tau_{1d}$, the second time constant $\tau_{2d}$, and the third time constant $\tau_{3d}$ may be determined as described below.

Figure 15:
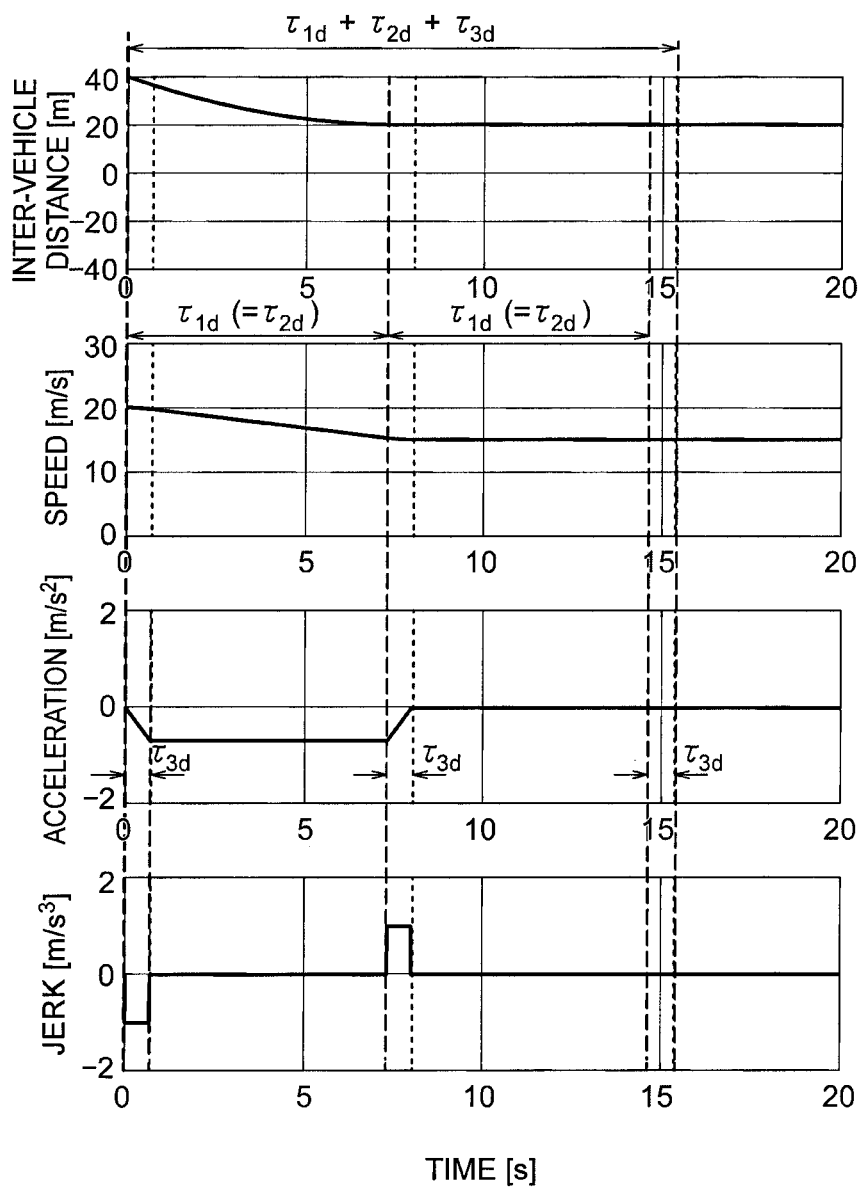
FIG. 15 is a graph for showing an operation of a vehicle traveling assist device according to a modification example of the second embodiment.

FIG. 15 is a graph for showing an operation of the vehicle traveling assist device 10 according to a modification example of the second embodiment. In FIG. 15, the output waveform obtained by inputting the input distance $d_{in}$ into the three-stage moving average filter 130 is shown. In this case, as the initial condition, the inter-vehicle distance initial value $d_0$ is set to 40 m, the target distance initial value $d^*_0$ is set to 20 m, the speed "v" of the own vehicle VO is set to 20 m/s, and the target speed $v_{tgt}$ is set to 15 m/s.

In FIG. 15, before the inter-vehicle distance "d" reaches the target distance d*, and the speed "v" of the own vehicle VO reaches the target speed $v_{tgt}$, the deceleration of the own vehicle VO increases and then becomes constant, and then decreases. The jerk of FIG. 15 is expressed as given by Expression (19). In Expression (19), $J_{set}$ indicates the jerk in a section in which the deceleration increases. The jerk $J_{set}$ is a positive value. Moreover, in FIG. 15, the first time constant $\tau_{1d}$ and the second time constant $\tau_{2d}$ are equal to each other.

$$j(t) = \begin{cases} -J_{set} & (0 \le t < \tau_{3d}) \\ 0 & (\tau_{3d} \le t < \tau_{1d}) \\ J_{set} & (\tau_{3d} \le t < \tau_{1d}) \\ 0 & (t \ge \tau_{1d}) \end{cases} \quad (19)$$

An acceleration a(t) of the own vehicle VO, a speed v(t) of the own vehicle VO, and an inter-vehicle distance d(t) can be calculated as given by Expression (20) to Expression (22) by integrating a jerk j(t) of Expression (19).

$$a(t) = \int j(t)dt \quad (20)$$

$$v(t) = \int a(t)dt \quad (21)$$

$$d(t) = \int \{v_{tgt} - v(t)\}dt = v_{tgt}t - \int v(t)dt \quad (22)$$

Through use of Expression (19) to Expression (22), the acceleration a(t) of the own vehicle VO, the speed v(t) of the own vehicle VO, and the inter-vehicle distance d(t) are expressed as given by Expression (23) to Expression (25). In those expressions, $C_{10}$, $C_{11}$, $C_{12}$, $C_{20}$, $C_{21}$, $C_{22}$, $C_{30}$, $C_{31}$, $C_{32}$, $C_{40}$, $C_{41}$, and $C_{42}$ are constants.

$$a(t) = \begin{cases} -J_{set}t + C_{10} & (0 \le t < \tau_{3d}) \\ C_{20} & (\tau_{3d} \le t < \tau_{1d}) \\ J_{set}t + C_{30} & (\tau_{1d} \le t < \tau_{1d} + \tau_{3d}) \\ C_{40} & (t \ge \tau_{1d} + \tau_{3d}) \end{cases} \quad (23)$$

$$v(t) = \begin{cases} -\frac{1}{2}J_{set}t^2 + C_{10}t + C_{11} & (0 \le t < \tau_{3d}) \\ C_{20}t + C_{21} & (\tau_{3d} \le t < \tau_{1d}) \\ \frac{1}{2}J_{set}t^2 + C_{30}t + C_{31} & (\tau_{1d} \le t < \tau_{1d} + \tau_{3d}) \\ C_{40}t + C_{41} & (t \ge \tau_{1d} + \tau_{3d}) \end{cases} \quad (24)$$

$$d(t) = \begin{cases} \frac{1}{6}J_{set}t^3 - \frac{1}{2}C_{10}t^2 + (v_{tgt} - C_{11})t - C_{12} & (0 \le t < \tau_{3d}) \\ -\frac{1}{2}C_{20}t^2 + (v_{tgt} - C_{21})t - C_{22} & (\tau_{3d} \le t < \tau_{1d}) \\ -\frac{1}{6}J_{set}t^3 - \frac{1}{2}C_{30}t^2 + (v_{tgt} - C_{31})t - C_{32} & (\tau_{1d} \le t < \tau_{1d} + \tau_{3d}) \\ -\frac{1}{2}C_{40}t^2 + (v_{tgt} - C_{41})t - C_{42} & (t \ge \tau_{1d} + \tau_{3d}) \end{cases} \quad (25)$$

At the time t=0, the speed "v" of the own vehicle VO is a speed initial value $v_0$, and the inter-vehicle distance "d" is an inter-vehicle distance initial value $d_0$. Moreover, at the time $t=\tau_{3d}$, $\tau_{1d}$, and $\tau_{1d}+\tau_{3d}$, the acceleration, the speed, and the inter-vehicle distance are continuous. From this fact, the above-mentioned respective constants $C_{10}$ to $C_{42}$ are determined as given by Expression (26) to Expression (37).

$$C_{10} = 0 \quad (26)$$

$$C_{11} = v_0 \quad (27)$$

$$C_{12} = -d_0 \quad (28)$$

$$C_{20} = -J_{set}\tau_{3d} \quad (29)$$

$$C_{21} = v_0 + \frac{1}{2}J_{set}\tau_{3d}^2 \quad (30)$$

$$C_{22} = -d_0 - \frac{1}{6}J_{set}\tau_{3d}^3 \quad (31)$$

$$C_{30} = -J_{set}(\tau_{1d} + \tau_{3d}) \quad (32)$$

$$C_{31} = v_0 + \frac{1}{2}J_{set}(\tau_{1d}^2 + \tau_{3d}^2) \quad (33)$$

$$C_{32} = -d_0 - \frac{1}{6}J_{set}(\tau_{1d}^3 + \tau_{3d}^3) \quad (34)$$

$$C_{40} = 0 \quad (35)$$

$$C_{41} = v_0 - J_{set}\tau_{1d}\tau_{3d} \quad (36)$$

$$C_{42} = -d_0 + \frac{1}{2}J_{set}\tau_{1d}\tau_{3d}(\tau_{1d} + \tau_{3d}) \quad (37)$$

In this case, in consideration of a terminal condition that the speed "v" of the own vehicle VO reaches the target speed $v_{tgt}$ and the inter-vehicle distance "d" reaches the target distance d* at a time $t \ge \tau_{1d}+\tau_{3d}$, Expression (38) and Expression (39) are satisfied for the target speed $v_{tgt}$ and the target distance d*, respectively.

$$v_{tgt} = v_0 - J_{set}\tau_{1d}\tau_{3d} \quad (38)$$

$$d^* = d_0 - \frac{1}{2}J_{set}\tau_{1d}\tau_{3d}(\tau_{1d} + \tau_{3d}) \quad (39)$$

Expression (40) can be derived by eliminating $J_{set}$ from Expression (38) and Expression (39). As described above, the series of steps of deceleration operation can be achieved through use of the three-stage moving average filter 130 by determining the sum of the first time constant $\tau_{1d}$ and the third time constant $\tau_{3d}$ based on the speed initial value $v_0$, the inter-vehicle distance initial value $d_0$, the target speed $v_{tgt}$, and the target distance d*. The series of steps of deceleration operation is the operation of increasing the deceleration, maintaining the deceleration constant, and then decreasing the deceleration.

$$\tau_{1d} + \tau_{3d} = \frac{2(d_0 - d^*)}{v_0 - v_{tgt}} \quad (40)$$

Further, Expression (41) is obtained by eliminating the first time constant $\tau_{1d}$ from Expression (38) and Expression (39).

$$v_{tgt} = v_0 - J_{set}\left\{\frac{2(d_0 - d^*)}{v_0 - v_{tgt}} - \tau_{3d}\right\}\tau_{3d} \quad (41)$$

The third time constant $\tau_{3d}$ is obtained from Expression (40) as given by Expression (42). The first time constant $\tau_{1d}$ and the third time constant $\tau_{3d}$ can be determined by substituting the speed initial value $v_0$, the inter-vehicle distance initial value $d_0$, the target speed $v_{tgt}$, and the target distance d* into Expression (42), and by substituting a target jerk for $J_{set}$. As a result, the series of steps of deceleration operation can be achieved at the target jerk. In the following, $J_{set}$ is referred to as "target jerk."

$$\tau_{3d} = \frac{\frac{2(d_0 - d^*)}{v_0 - v_{tgt}} \pm \sqrt{\left\{\frac{2(d_0 - d^*)}{v_0 - v_{tgt}}\right\}^2 - \frac{4}{J_{set}}(v_0 - v_{tgt})}}{2} \quad (42)$$

Further, Expression (43) is obtained by setting $A_{set} = -J_{set} \times \tau_{3d}$ as a target deceleration $A_{set}$, and by eliminating the target jerk $J_{set}$ from Expression (41).

$$v_{tgt} = v_0 + A_{set}\left(\frac{2(d_0 - d^*)}{v_0 - v_{tgt}} - \tau_{3d}\right) \quad (43)$$

The third time constant $\tau_{3d}$ is obtained from Expression (43) as given by Expression (44). As described above, the first time constant $\tau_{1d}$ and the third time constant $\tau_{3d}$ can be determined based on the speed initial value $v_0$, the inter-vehicle distance initial value $d_0$, the target speed $v_{tgt}$, the target distance d*, and the target deceleration $A_{set}$. As a result, the target deceleration $A_{set}$ can be reached through the series of steps of deceleration operation.

$$\tau_{3d} = \frac{2(d_0 - d^*)}{v_0 - v_{tgt}} + \frac{v_0 - v_{tgt}}{A_{set}} \quad (44)$$

As described above, the plan design unit 15 acquires the distance information, the own vehicle speed information, the target distance d*, and the target speed $v_{tgt}$, generates the first time constant $\tau_{1d}$, the second time constant $\tau_{2d}$, and the third time constant $\tau_{3d}$, and outputs the generated time constants to the plan generation unit 13. As a result, the jerk during the acceleration and the deceleration can be set to the target jerk $J_{set}$. Besides, the deceleration can be set to the target deceleration $A_{set}$.

Figure 16:
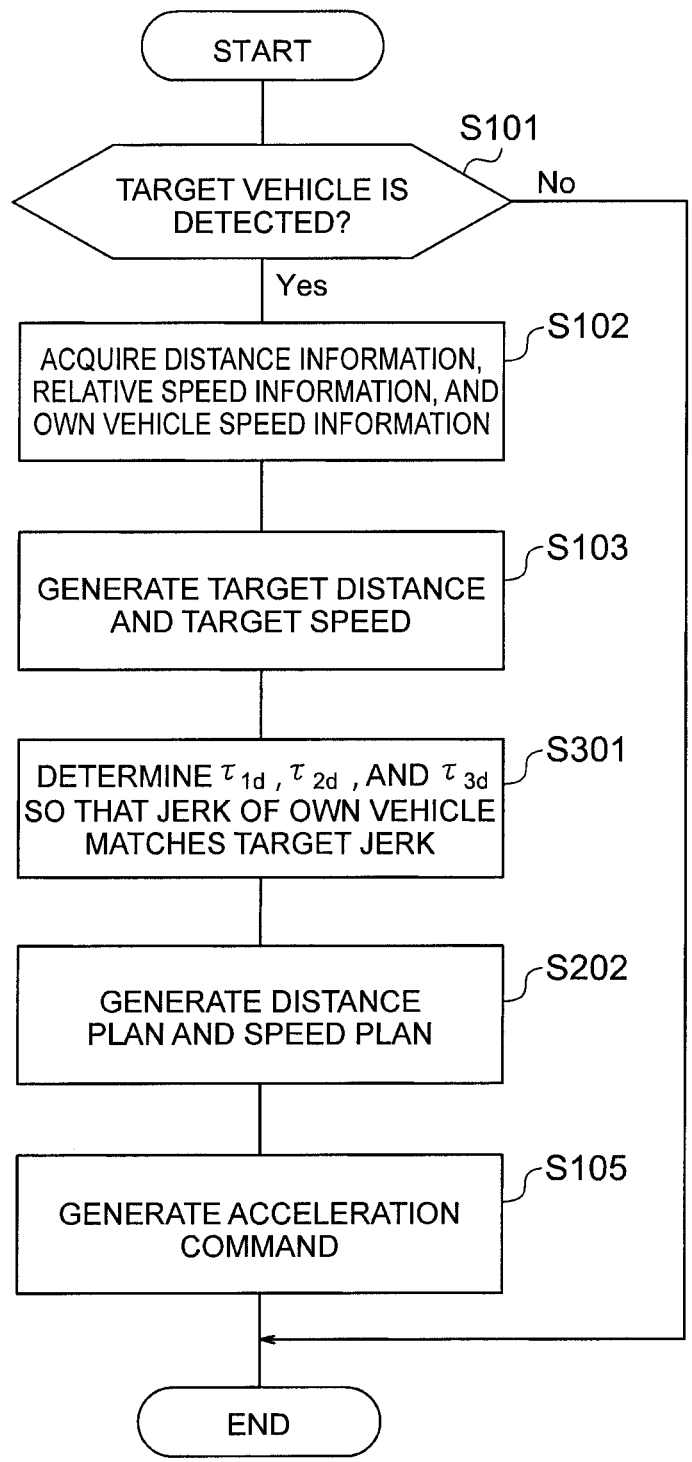
FIG. 16 is a flowchart for illustrating a first example of a vehicle traveling assist routine executed by the vehicle traveling assist device according to the modification example of the second embodiment.

FIG. 16 is a flowchart for illustrating a first example of a vehicle traveling assist routine executed by the vehicle traveling assist device 10 according to the modification example of the second embodiment. The routine of FIG. 16 is executed, for example, each time a constant period elapses after the ignition key switch of the own vehicle VO is turned on. In the routine of FIG. 16, the same steps as those of the routine of FIG. 14 are denoted by the same step numbers.

When a target vehicle VT is not detected in Step S101, the information acquisition unit 11 temporarily terminates this routine.

When a target vehicle VT is detected, in Step S102, the information acquisition unit 11 acquires the distance information, the relative speed information, and the own vehicle speed information. After that, in Step S103, the target determination unit 12 generates the target distance d* and the target speed $v_{tgt}$.

After that, in Step S301, the plan design unit 15 uses Expression (40) and Expression (42) to determine the first time constant $\tau_{1d}$, the second time constant $\tau_{2d}$, and the third time constant $\tau_{3d}$ so that the jerk of the own vehicle VO matches the target jerk $J_{set}$.

After that, in Step S202, the plan generation unit 13 generates the distance plan $d_{plan}$ and the speed plan $v_{plan}$ based on the determined first time constant $\tau_{1d}$, second time constant $\tau_{2d}$, and third time constant $\tau_{3d}$.

After that, the vehicle control unit 14 generates the acceleration command $a_{ref}$ in Step S105, outputs the generated acceleration command $a_{ref}$ to the driving/braking control device 40, and temporarily terminates this routine.

Figure 17:
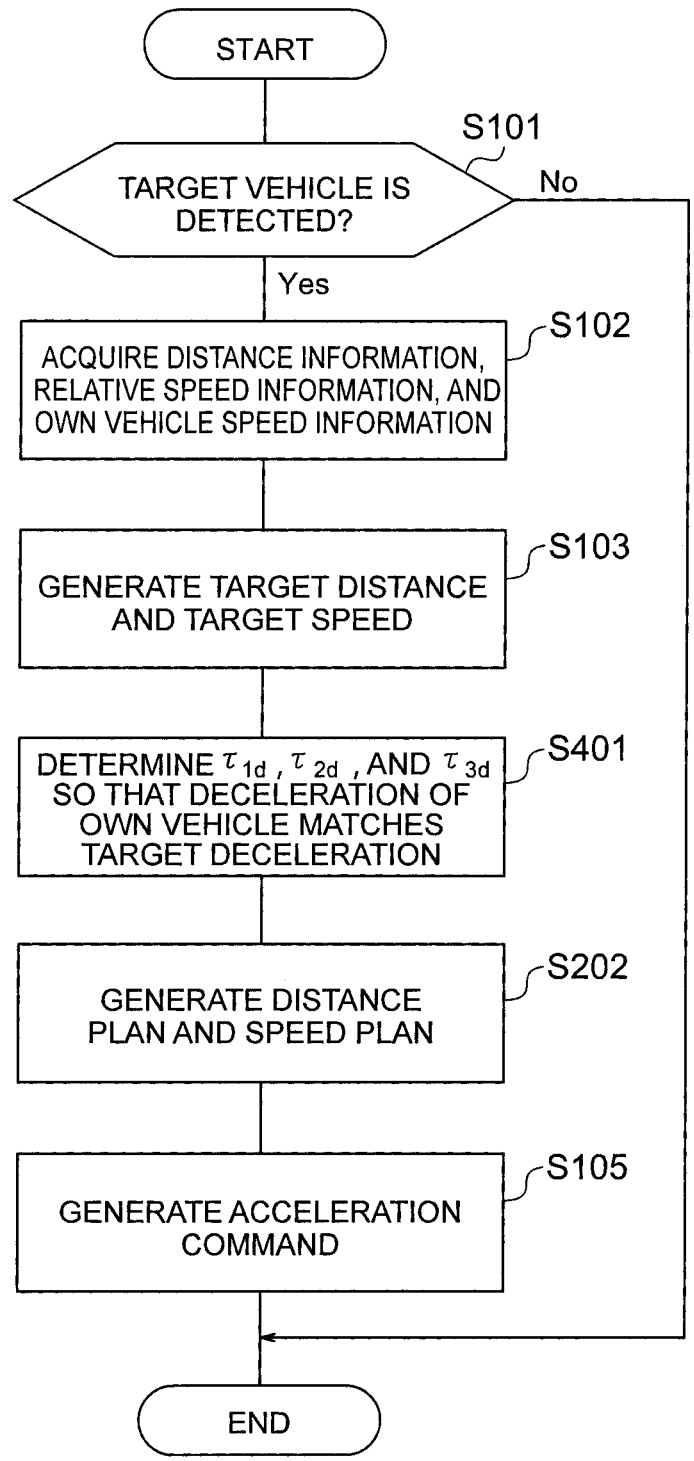
FIG. 17 is a flowchart for illustrating a second example of the vehicle traveling assist routine executed by the vehicle traveling assist device according to the modification example of the second embodiment.

FIG. 17 is a flowchart for illustrating a second example of the vehicle traveling assist routine executed by the vehicle traveling assist device 10 according to the modification example of the second embodiment. The routine of FIG. 17 is executed, for example, each time a constant period elapses after the ignition key switch of the own vehicle VO is turned on. In the routine of FIG. 17, the same steps as those of the routine of FIG. 14 are denoted by the same step numbers.

When a target vehicle VT is not detected in Step S101, the information acquisition unit 11 temporarily terminates this routine.

When a target vehicle VT is detected, in Step S102, the information acquisition unit 11 acquires the distance information, the relative speed information, and the own vehicle speed information. After that, in Step S103, the target determination unit 12 generates the target distance d* and the target speed $v_{tgt}$.

After that, in Step S401, the plan design unit 15 uses Expression (40) and Expression (44) to determine the first time constant $\tau_{1d}$, the second time constant $\tau_{2d}$, and the third time constant $\tau_{3d}$ so that the deceleration of the own vehicle VO matches the target deceleration $A_{set}$.

After that, in Step S202, the plan generation unit 13 generates the distance plan $d_{plan}$ and the speed plan $v_{plan}$ based on the determined first time constant $\tau_{1d}$, second time constant $\tau_{2d}$, and third time constant $\tau_{3d}$.

After that, the vehicle control unit 14 generates the acceleration command $a_{ref}$ in Step S105, outputs the generated acceleration command $a_{ref}$ to the driving/braking control device 40, and temporarily terminates this routine.

As described above, the plan design unit 15 may calculate the first time constant $\tau_{1d}$, the second time constant $\tau_{2d}$, and the third time constant $\tau_{3d}$ so that a following jerk matches the target jerk $J_{set}$. The following jerk is a jerk occurring during the following period.

With this configuration, in the acceleration and the deceleration of the own vehicle VO until the target distance d* and the target speed $v_{tgt}$ are reached, the deterioration of the ride comfort due to the occurrence of the excessive jerk can be suppressed by limiting the occurring jerk.

Further, the plan design unit 15 may calculate the first time constant $\tau_{1d}$, the second time constant $\tau_{2d}$, and the third time constant $\tau_{3d}$ so that a following acceleration matches the target deceleration $A_{set}$. The following acceleration is an acceleration occurring in the own vehicle VO during the following period.

With this configuration, in the acceleration and the deceleration of the own vehicle VO until the target distance d* and the target speed $v_{tgt}$ are reached, the deterioration of the ride comfort due to the excessive jerk can be suppressed by limiting the occurring acceleration.

Third Embodiment

Figure 18:
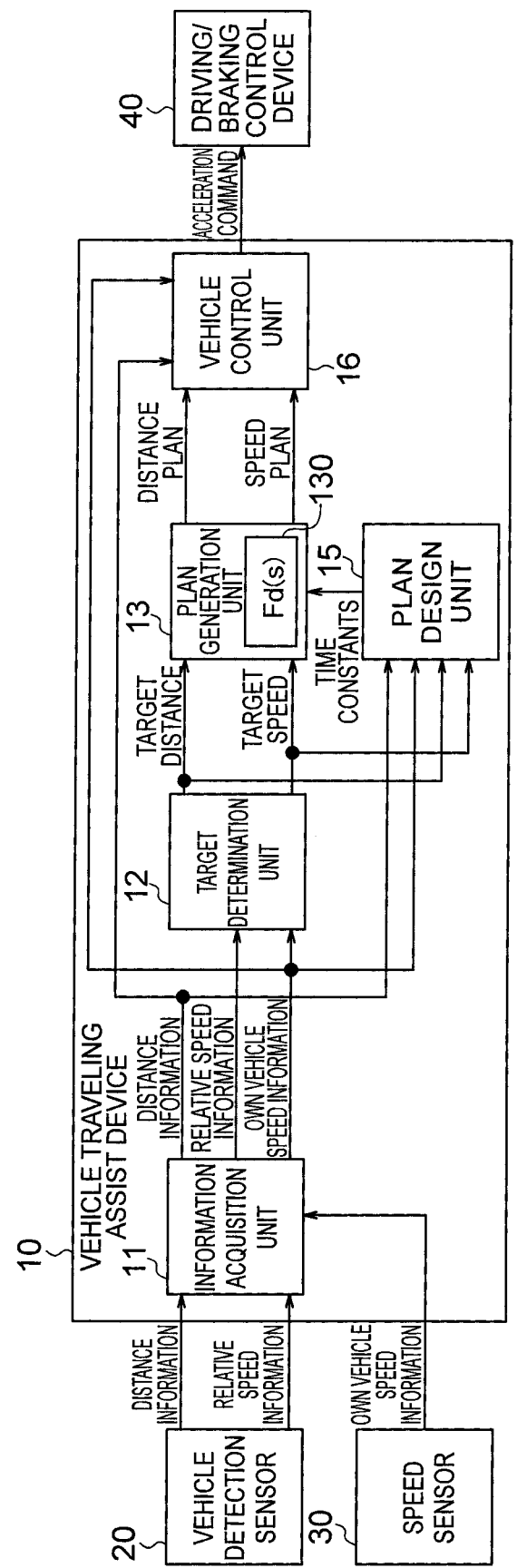
FIG. 18 is a block diagram for illustrating a configuration of a vehicle control device in a third embodiment of this disclosure.

Description is now given of a vehicle traveling assist device according to a third embodiment of this disclosure. FIG. 18 is a block diagram for illustrating a configuration of a vehicle control device in the third embodiment. The vehicle control device of FIG. 18 includes the vehicle traveling assist device 10, the vehicle detection sensor 20, the speed sensor 30, and the driving/braking control device 40.

The vehicle traveling assist device 10 of FIG. 18 includes the information acquisition unit 11, the target determination unit 12, the plan generation unit 13, the plan design unit 15, and a vehicle control unit 16. The vehicle traveling assist device 10 of FIG. 18 is different from those of the first embodiment and the second embodiment in that the vehicle control unit 16 is provided in place of the vehicle control unit 14 of FIG. 3 and FIG. 10. In FIG. 18, the same elements as those of FIG. 3 and FIG. 10 are denoted by the same reference symbols.

The vehicle control unit 16 uses a dynamic vehicle model representing a behavior of the own vehicle VO to calculate a predicted inter-vehicle distance $d_k$, a predicted speed $v_k$, and a predicted acceleration $a_k$. The predicted inter-vehicle distance $d_k$ is a prediction value of the inter-vehicle distance "d." The predicted speed $v_k$ is a prediction value of the speed "v" of the own vehicle VO. The predicted acceleration $a_k$ is a prediction value of the acceleration "a" of the own vehicle VO.

The vehicle control unit 16 calculates the acceleration command $a_{ref}$ from an evaluation function for a distance deviation and a speed deviation. The distance deviation is a deviation between the distance plan $d_{plan}$ and the predicted inter-vehicle distance $d_k$. The speed deviation is a deviation between the speed plan $v_{plan}$ and the predicted speed $v_k$.

The dynamic vehicle model is a model for predicting, each time a constant period $T_{per}$ elapses, the behavior of the own vehicle VO from the current time t(0) to a future time that is a time Th after the current time t(0). The vehicle control unit 16 solves an optimization problem of obtaining a control input "u" for minimizing an evaluation function J which evaluates each of the distance deviation and the speed deviation each time the constant period $T_{per}$ elapses, and calculates respective solutions as the acceleration command $a_{ref}$.

In this case, the number of points of each of the predicted inter-vehicle distance $d_k$ and the predicted speed $v_k$ is N. The number N of points is obtained as $N=Th/T_{per}$ from the time Th and the constant period $T_{per}$. A time period from the current time t(0) to the future time that is the time Th after the current time t(0) is referred to as "horizon."

Calculation processing for the acceleration command $a_{ref}$ by the vehicle control unit 16 is now more specifically described. Expression (45) to Expression (47) indicate that the control input "u" for minimizing the evaluation function J is obtained.

$$\min_u J \quad (45)$$

$$\dot{x}=f(x,u) \quad (46)$$

$$x_0=x(0) \quad (47)$$

In Expression (45) to Expression (47), "x" is a vehicle state quantity, and $x_0$ is an initial value of the vehicle state quantity "x." Moreover, is a prediction value of the vehicle state quantity "x." The function f(x, u) is a vector value function relating to the dynamic vehicle model.

The vehicle control unit 16 sets the vehicle state quantity "x" as given by Expression (48), and sets the control input "u" as given by Expression (49). In the following, $[ \ldots ]^T$ represents a transposed matrix.

$$x=[d,v,a]^T \quad (48)$$

$$u=[a_{ref}]^T \quad (49)$$

In Expression (48) and Expression (49), "d" is the inter-vehicle distance, "v" is the speed of the own vehicle VO, "a" is the acceleration of the own vehicle VO, and $a_{ref}$ is the acceleration command.

The dynamic vehicle model is expressed as given by Expression (50).

$$\dot{x} = f(x,u) = \begin{bmatrix} v_{tgt} - v \\ a \\ \dfrac{1}{T_a}(a_{ref} - a) \end{bmatrix} \quad (50)$$

In Expression (50), $T_a$ is a response delay of the driving/braking control device 40 with respect to the acceleration command $a_{ref}$.

The evaluation function J is expressed as given by Expression (51).

$$J = (h_N(x_N) - r_N)^T W_N(h_N(x_N) - r_N) + \sum_{k=0}^{N-1} (h(x_k, u_k) - r_k)^T W(h(x_k, u_k) - r_k \quad (51)$$

In Expression (51), $x_k$ is a prediction value of the vehicle state quantity "x" at a prediction point "k." Here, k=0, N. The value $x_N$ is a prediction value of the vehicle state quantity "x" at the prediction point N. Moreover, $u_k$ is a control input at the prediction point "k." Here, k=0, . . . , N−1. The function "h" is a vector value function relating to evaluation items. The function $h_N$ is a vector value function relating to the evaluation items at the prediction point N. Further, $r_k$ is a target value at the prediction point "k." Here, k=0, . . . , N. The value $r_N$ is a target value at the prediction point N. Each of W and $W_N$ is a weighting matrix, and is a diagonal matrix having weights for the evaluation items at diagonal elements.

The vehicle control unit 16 sets the vector value function "h" relating to the evaluation items as given by Expression (52). The vehicle control unit 16 sets the vector value function $h_N$ relating to the evaluation items as given by Expression (53).

$$h=[d_k,v_k,a_{ref,k}]^T \quad (52)$$

$$h_N=[d_N,v_N]^T \quad (53)$$

In Expression (52), $d_k$ is the predicted inter-vehicle distance. The predicted inter-vehicle distance $d_k$ is the prediction value of the inter-vehicle distance "d" at the prediction point "k." The value $v_k$ is the predicted speed. The predicted speed $v_k$ is the prediction value of the speed "v" of the own vehicle VO at the prediction point "k." Further, $a_{ref,k}$ is a predicted acceleration command. The predicted acceleration command $a_{ref,k}$ is a prediction value of the acceleration command $a_{ref}$ being a control amount at the prediction point "k." In Expression (53), $d_N$ is a predicted inter-vehicle distance at the prediction point N. Further, $v_N$ is a predicted speed at the prediction point N. Here, k=0, . . . , N.

The vehicle control unit 16 sets a target value $r_k$ given by Expression (54) and a target value $r_N$ given by Expression (55) so that the predicted inter-vehicle distance $d_k$, the predicted speed $v_k$, and the predicted acceleration command $a_{ref,k}$ decrease.

$$r_k=[d_{plan,k},v_{plan,k}]^T \quad (54)$$

$$r_N=[d_{plan,N},v_{plan,N}]^T \quad (55)$$

In Expression (54) and Expression (55), $d_{plan,k}$ is a value of the distance plan $d_{plan}$ given by Expression (6) at the prediction point "k." Further, $d_{plan,N}$ is a value of the distance plan $d_{plan}$ given by Expression (6) at the prediction point N. Further, $v_{plan,k}$ is a value of the speed plan $v_{plan}$ given by Expression (7) at the prediction point "k." Moreover, $v_{plan,N}$ is a value of the speed plan $v_{plan}$ given by Expression (7) at the prediction point N.

The vehicle control unit 16 uses the evaluation function J given by Expression (51) to evaluate a deviation between the vector value function "h" and the target value $r_k$ and a deviation between the vector value function $h_N$ and the target value $r_N$. The vehicle control unit 16 solves the optimization problem of obtaining the control inputs "u" for minimizing the respective deviations each time the constant period $T_{per}$ elapses, and generates the respective solutions as the acceleration command $a_{ref}$. Processing for solving the optimization problem is publicly known, and hence a detailed description is omitted.

Figure 19:
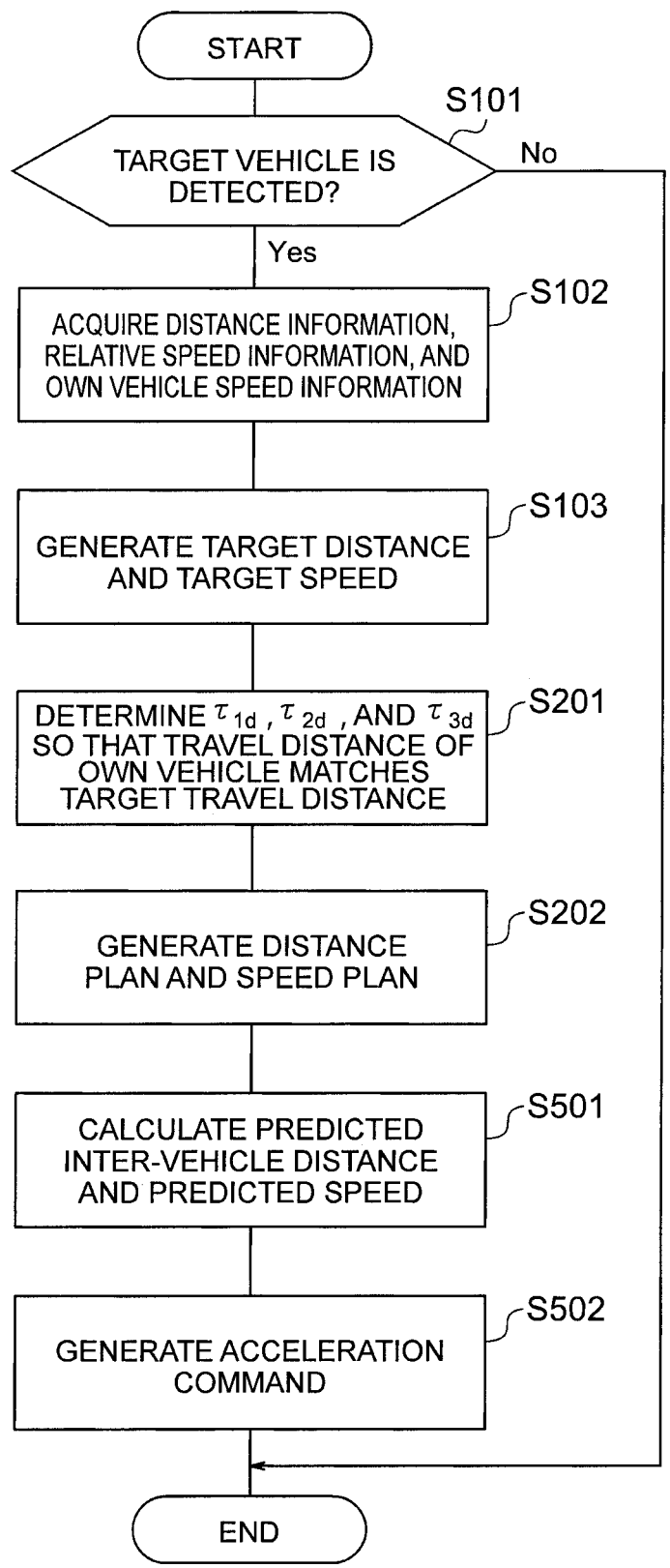
FIG. 19 is a flowchart for illustrating a vehicle traveling assist routine executed by the vehicle traveling assist device of FIG. 18.

FIG. 19 is a flowchart for illustrating a vehicle traveling assist routine executed by the vehicle traveling assist device 10 of FIG. 18. The routine of FIG. 19 is executed, for example, each time a constant period elapses after the ignition key switch of the own vehicle VO is turned on. In the routine of FIG. 17, the same steps as those of the routines of FIG. 9 and FIG. 14 are denoted by the same step numbers. Moreover, a detailed description of the same steps as those of the routines of FIG. 9 and FIG. 14 is omitted.

When a target vehicle VT is not detected in Step S101, the information acquisition unit 11 temporarily terminates this routine.

When a target vehicle VT is detected, in Step S102, the information acquisition unit 11 acquires the distance information, the relative speed information, and the own vehicle speed information. After that, in Step S103, the target determination unit 12 generates the target distance d* and the target speed $v_{tgt}$.

After that, in Step S201, the plan design unit 15 determines the first time constant $\tau_{1d}$, the second time constant $\tau_{2d}$, and the third time constant $\tau_{3d}$ so that the travel distance $x_t$ of the own vehicle VO matches the target travel distance Xtra. After that, in Step S202, the plan generation unit 13 generates the distance plan $d_{plan}$ and the speed plan $v_{plan}$ based on the determined first time constant $\tau_{2d}$, second time constant $\tau_{2d}$, and third time constant $\tau_{3d}$.

After that, in Step S501, the vehicle control unit 16 calculates the predicted inter-vehicle distance $d_k$ and the predicted speed $v_k$.

After that, in Step S502, the vehicle control unit 16 obtains the evaluation function J for evaluating the distance deviation being the deviation between the distance plan $d_{plan}$ and the predicted inter-vehicle distance $d_k$ and the speed deviation being the deviation between the speed plan $v_{plan}$ and the predicted speed $v_k$. The vehicle control unit 16 solves the optimization problem of obtaining the control input "u" for minimizing the evaluation function J, and outputs the respective solutions as the acceleration command $a_{ref}$. The vehicle control unit 16 outputs the generated acceleration command $a_{ref}$ to the driving/braking control device 40, and temporarily terminates this routine.

As described above, the vehicle control unit 16 in the third embodiment uses the dynamic vehicle model representing the behavior of the own vehicle VO to calculate the predicted inter-vehicle distance $d_k$ and the predicted speed $v_k$, and generates the acceleration command $a_{ref}$ based on the evaluation value of the distance deviation and the evaluation value of the speed deviation. The predicted inter-vehicle distance $d_k$ is the prediction value of the inter-vehicle distance "d." The predicted speed $v_k$ is the prediction value of the speed "v" of the own vehicle VO. The distance deviation is the deviation between the distance plan $d_{plan}$ and the predicted inter-vehicle distance $d_k$. The speed deviation is the deviation between the speed plan $v_{plan}$ and the predicted speed $v_k$.

Through the above-mentioned processing, also in the vehicle traveling assist device 10 of FIG. 18, as in the vehicle traveling assist device 10 of FIG. 10, the own vehicle VO can be controlled so that the inter-vehicle distance "d" reaches the target distance d*.

As a result, the vehicle traveling assist device 10 can calculate the acceleration command $a_{ref}$ for smoothly following the distance plan $d_{plan}$ and the speed plan $v_{plan}$, within the horizon. Further, the vehicle traveling assist device 10 builds the response delay of the driving/braking control device 40 into the dynamic vehicle model, thereby being capable of calculating the control amount reflecting the delay in the behavior of the own vehicle VO with respect to the acceleration command $a_{ref}$ while suppressing the deterioration of the ride comfort.

Moreover, the vehicle control unit 16 of FIG. 18 obtains the control input "u" for minimizing the evaluation value relating to the distance deviation and the evaluation value relating to the speed deviation, to thereby generate the acceleration command $a_{ref}$.

The vehicle control unit 16 may obtain such a control input "u" that the evaluation value relating to the distance deviation and the evaluation value relating to the speed deviation are smaller than threshold values set in advance.

When such a control input "u" that the evaluation values of the deviations are smaller than threshold values cannot be obtained even after iterative calculation is executed a predetermined number of times, the vehicle control unit 16 may obtain the control input "u" at the time when the smallest evaluation values are obtained out of the plurality of evaluation values calculated through the iterative calculation.

Moreover, the vehicle control unit 16 may invert the sign of the evaluation function J, to thereby obtain such a control input "u" that the evaluation values of the respective deviations are the maximum. Moreover, the vehicle control unit 16 may invert the sign of the evaluation function J, to thereby obtain such a control input "u" that the evaluation values of the respective deviations are larger than threshold values set in advance.

When such a control input "u" that the evaluation values of the respective deviations are larger than threshold values cannot be obtained even after iterative calculation is executed a predetermined number of times, the vehicle control unit 16 may obtain the control input "u" at the time when the largest evaluation values are obtained out of the plurality of evaluation values calculated through the iterative calculation.

Moreover, the plan generation unit 13 may further use Expression (10) to calculate the acceleration plan $a_{plan}$, and may output the calculated acceleration plan $a_{plan}$ to the vehicle control unit 16. Then, the vehicle control unit 16 may set the target value $r_k$ as given by Expression (56), and may calculate the acceleration command $a_{ref}$ through the optimization calculation. In this expression, $a_{plan,k}$ is a value of the acceleration plan $a_{plan}$ given by Expression (10) at the prediction point "k."

$$r_k = [d_{plan,k}, v_{plan,k}, a_{plan,k}]^T \tag{56}$$

Moreover, in the third embodiment, the plan design unit 15 may determine the first time constant $\tau_{1d}$, the second time constant $\tau_{2d}$, and the third time constant $\tau_{3d}$ so that the jerk of the own vehicle VO matches the target jerk $J_{set}$.

Moreover, in the third embodiment, the plan design unit 15 may determine the first time constant $\tau_{1d}$, the second time constant $\tau_{2d}$, and the third time constant $\tau_{3d}$ so that the deceleration of the own vehicle VO matches the target deceleration $A_{set}$.

Moreover, in the third embodiment, the plan design unit 15 calculates the first time constant $\tau_{1d}$, the second time constant $\tau_{2d}$, and the third time constant $\tau_{3d}$. The plan design unit 15 may be omitted, and the first time constant $\tau_{1d}$, the second time constant $\tau_{2d}$, and the third time constant $\tau_{3d}$ may be set in advance.

Moreover, the moving average filter in the first embodiment to the third embodiment is a kind of a digital low-pass filter applied to a finite impulse response. Thus, in the vehicle traveling assist devices according to the first embodiment to the third embodiment, another digital low-pass filter may be used in place of the moving average filter.

Moreover, in the vehicle control devices in the first embodiment to the third embodiment, the inter-vehicle distance "d" and the relative speed $v_{rel}$ are calculated by the vehicle detection sensor 20, but, in place of the vehicle detection sensor 20, a sensor which can calculate the inter-vehicle distance "d" and a sensor which can detect the relative speed $v_{rel}$ may be used. For example, the vehicle detection sensor 20 may be a combination a camera and an image processing device, or a combination of a radar, a camera, and an image processing device.

Moreover, the information acquisition unit 11 may calculate the inter-vehicle distance "d" and the relative speed $v_{rel}$ based on the information detected by the vehicle detection sensor 20.

Moreover, in FIG. 3, the vehicle detection sensor 20 is illustrated as a single sensor, but the vehicle detection sensor 20 may be a plurality of sensors which detect a front direction, a rear direction, a right side direction, and a left side direction of the own vehicle VO, respectively.

Moreover, the target vehicle speed information may be acquired from the target vehicle VT, or may be acquired from a speed sensor arranged on a side of the road.

Figure 20:
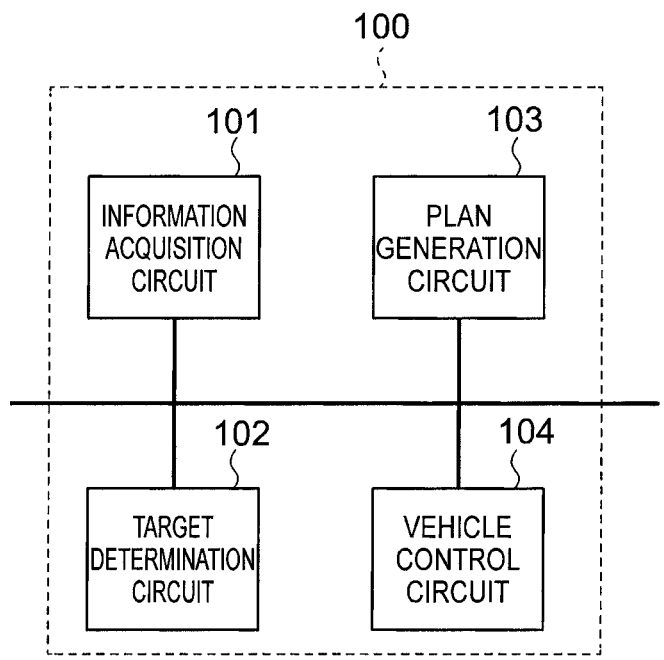
FIG. 20 is a configuration diagram for illustrating a first example of a processing circuit for implementing functions of the vehicle traveling assist device according to the first embodiment.
Figure 21:
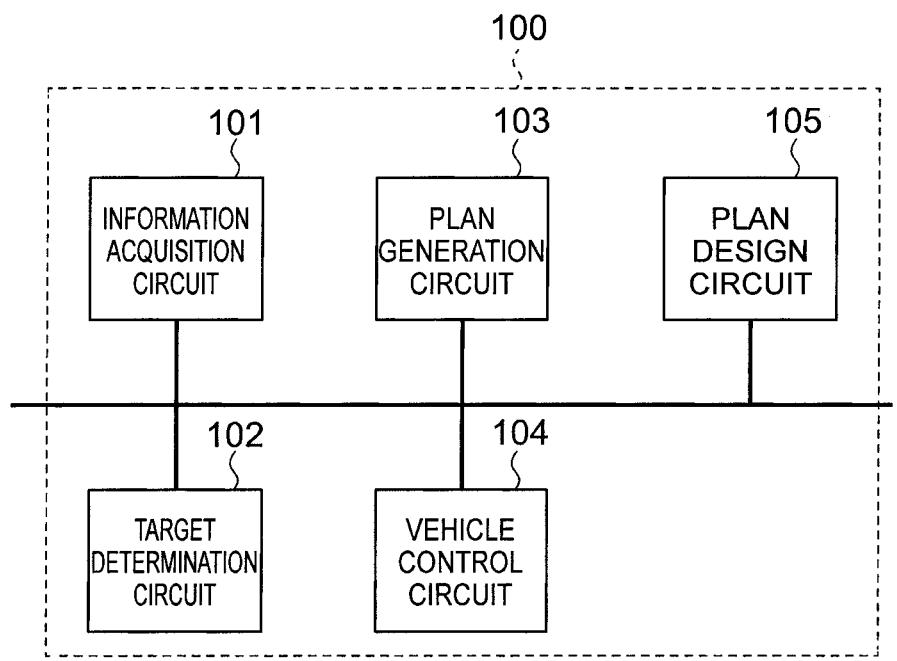
FIG. 21 is a configuration diagram for illustrating a first example of a processing circuit for implementing the functions of each of the vehicle traveling assist devices according to the second embodiment and the third embodiment.

Moreover, the functions of each of the vehicle traveling assist devices 10 according to the first embodiment to the third embodiment are implemented by a processing circuit. FIG. 20 is a configuration diagram for illustrating a first example of a processing circuit for implementing the functions of the vehicle traveling assist device 10 according to the first embodiment. FIG. 21 is a configuration diagram for illustrating a first example of a processing circuit for implementing the functions of each of the vehicle traveling assist devices 10 according to the second embodiment and the third embodiment. A processing circuit 100 in the first example is dedicated hardware.

The information acquisition unit 11 of FIG. 3 is implemented by an information acquisition circuit 101. The target determination unit 12 is implemented by a target determination circuit 102. The plan generation unit 13 is implemented by a plan generation circuit 103. The vehicle control unit 14 is implemented by a vehicle control circuit 104.

Further, the processing circuit 100 corresponds to, for example, a single circuit, a complex circuit, a programmed processor, a processor for a parallel program, an application specific integrated circuit (ASIC), a field programmable gate array (FPGA), or a combination thereof.

The components of the vehicle traveling assist device 10 are not only implemented by the dedicated hardware, but may also be implemented by software, firmware, or a combination of software and firmware. The software or the firmware is stored in a memory of a computer as a program. The computer means hardware which executes the program, and is implemented by, for example, a central processing unit (CPU), a central processing device, a processing device, a calculation device, a microprocessor, a microcomputer, a processor, or a digital signal processor (DSP).

Figure 22:
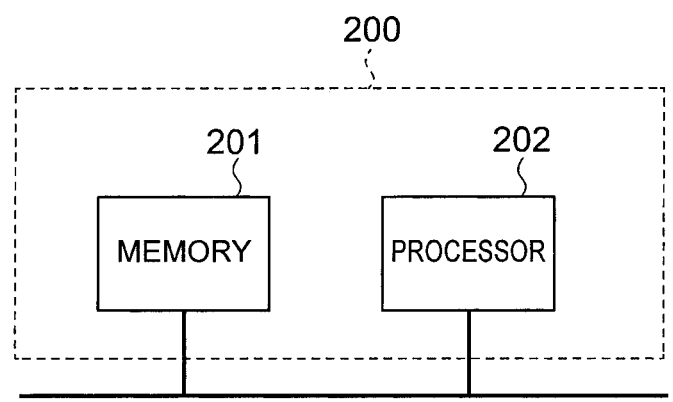
FIG. 22 is a configuration diagram for illustrating a second example of the processing circuit for implementing the functions of each of the vehicle traveling assist devices according to the first embodiment to the third embodiment.

Further, FIG. 22 is a configuration diagram for illustrating a second example of the processing circuit for implementing the functions of each of the vehicle traveling assist devices 10 according to the first embodiment to the third embodiment. A processing circuit 200 in the second example includes a memory 201 and a processor 202.

In the processing circuit 200, the functions of the vehicle traveling assist device 10 are implemented by software, firmware, or a combination of software and firmware. The software and the firmware are described as programs to be stored in the memory 201. The processor 202 reads out and executes the programs stored in the memory 201, to thereby implement the respective functions.

The programs stored in the memory 201 can also be regarded as programs for causing a computer to execute the process or method of each of the above-mentioned units. In this case, the memory 201 corresponds to, for example, a nonvolatile or volatile semiconductor memory, such as a random access memory (RAM), a read only memory (ROM), a flash memory, an erasable programmable read only memory (EPROM), or an electrically erasable and programmable read only memory (EEPROM). Further, a magnetic disk, a flexible disk, an optical disc, a compact disc, a mini disc, or a DVD also corresponds to the memory 201.

The functions of the above-mentioned vehicle traveling assist device may be implemented partially by dedicated hardware, and partially by software or firmware.

In this way, the processing circuit can implement the functions of the above-mentioned vehicle traveling assist device by hardware, software, firmware, or a combination thereof.

What is claimed is:

1. A vehicle traveling assist device, comprising:
    a target determination circuitry to calculate a target speed of an own vehicle and a target distance being a target value of an inter-vehicle distance between the own vehicle and a target vehicle based on target vehicle speed information on a speed of the target vehicle;
    a plan generation circuitry to generate a distance plan being a temporal change in the inter-vehicle distance until the inter-vehicle distance reaches the target distance based on the target distance, and to generate a speed plan being a temporal change in a speed of the own vehicle until the inter-vehicle distance reaches the target distance based on the target speed and the target distance; and
    a vehicle control circuitry to generate an acceleration command for the own vehicle based on the distance plan and the speed plan, and to supply the generated acceleration command to a driving/braking control device of the own vehicle,
    wherein the plan generation circuitry is configured to generate the distance plan and the speed plan through use of a three-stage moving average filter being a filter including a first moving average filter, a second moving average filter, and a third moving average filter which are connected sequentially and in series to each other.

2. The vehicle traveling assist device according to claim 1, wherein the target vehicle is a vehicle traveling in front on a lane on which the own vehicle is traveling.

3. The vehicle traveling assist device according to claim 1, wherein the target vehicle is a vehicle which is traveling on a lane to which the own vehicle is going to move.

4. The vehicle traveling assist device according to claim 1,
    wherein a first time constant being a time constant of the first moving average filter and a second time constant being a time constant of the second moving average filter are set to values equal to each other, and
    wherein a third time constant being a time constant of the third moving average filter is set to a value smaller than the first time constant and the second time constant.

5. The vehicle traveling assist device according to claim 1, wherein a first time constant being a time constant of the first moving average filter, a second time constant being a time constant of the second moving average filter, and a third time constant being a time constant of the third moving average filter are set to values equal to one another.

6. The vehicle traveling assist device according to claim 4, further comprising a plan design circuitry to calculate the first time constant, the second time constant, and the third time constant based on own vehicle speed information on the speed of the own vehicle, distance information on the inter-vehicle distance, the target speed, and the target distance.

7. The vehicle traveling assist device according to claim 5, further comprising a plan design circuitry to calculate the first time constant, the second time constant, and the third time constant based on own vehicle speed information on the speed of the own vehicle, distance information on the inter-vehicle distance, the target speed, and the target distance.

8. The vehicle traveling assist device according to claim 6, wherein the plan design circuitry is configured to calculate the first time constant, the second time constant, and the third time constant so that a travel distance of the own vehicle in a period until the speed of the own vehicle matches the target speed and the inter-vehicle distance matches the target distance matches a target travel distance.

9. The vehicle traveling assist device according to claim 7, wherein the plan design circuitry is configured to calculate the first time constant, the second time constant, and the third time constant so that a travel distance of the own vehicle in a period until the speed of the own vehicle matches the target speed and the inter-vehicle distance matches the target distance matches a target travel distance.

10. The vehicle traveling assist device according to claim 8,
wherein the own vehicle is a vehicle traveling on a merging lane,
wherein the target vehicle is a vehicle traveling on a main road lane adjacent to the merging lane, and
wherein the target travel distance is equal to or shorter than a length of a merging section being a section in which the main road lane is adjacent to the merging lane.

11. The vehicle traveling assist device according to claim 9,
wherein the own vehicle is a vehicle traveling on a merging lane,
wherein the target vehicle is a vehicle traveling on a main road lane adjacent to the merging lane, and
wherein the target travel distance is equal to or shorter than a length of a merging section being a section in which the main road lane is adjacent to the merging lane.

12. The vehicle traveling assist device according to claim 6, wherein the plan design circuitry is configured to calculate the first time constant, the second time constant, and the third time constant so that a jerk occurring in the own vehicle in a period until the speed of the own vehicle matches the target speed and the inter-vehicle distance matches the target distance matches a target jerk.

13. The vehicle traveling assist device according to claim 7, wherein the plan design circuitry is configured to calculate the first time constant, the second time constant, and the third time constant so that a jerk occurring in the own vehicle in a period until the speed of the own vehicle matches the target speed and the inter-vehicle distance matches the target distance matches a target jerk.

14. The vehicle traveling assist device according to claim 6, wherein the plan design circuitry is configured to calculate the first time constant, the second time constant, and the third time constant so that an acceleration occurring in the own vehicle in a period until the speed of the own vehicle matches the target speed and the inter-vehicle distance matches the target distance matches a target acceleration.

15. The vehicle traveling assist device according to claim 7, wherein the plan design circuitry is configured to calculate the first time constant, the second time constant, and the third time constant so that an acceleration occurring in the own vehicle in a period until the speed of the own vehicle matches the target speed and the inter-vehicle distance matches the target distance matches a target acceleration.

16. The vehicle traveling assist device claim 1, wherein the vehicle control circuitry is configured to calculate, through use of a dynamic vehicle model representing a behavior of the own vehicle, a predicted inter-vehicle distance being a prediction value of the inter-vehicle distance and a predicted speed being a prediction value of the speed of the own vehicle, and to generate the acceleration command based on an evaluation value for a distance deviation being a deviation between the distance plan and the predicted inter-vehicle distance and an evaluation value for a speed deviation being a deviation between the speed plan and the predicted speed.

* * * * *